United States Patent
Okada et al.

(10) Patent No.: US 10,705,414 B2
(45) Date of Patent: Jul. 7, 2020

(54) PROJECTOR HAVING REFRIGERANT GENERATOR

(71) Applicant: SEIKO EPSON CORPORATION, Tokyo (JP)

(72) Inventors: Naoya Okada, Shiojiri (JP); Nobuo Sugiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/232,960

(22) Filed: Dec. 26, 2018

(65) Prior Publication Data

US 2019/0196313 A1 Jun. 27, 2019

(30) Foreign Application Priority Data

Dec. 27, 2017 (JP) .................. 2017-250700

(51) Int. Cl.
*G03B 21/16* (2006.01)
*F24F 3/14* (2006.01)
(Continued)

(52) U.S. Cl.
CPC ............ *G03B 21/16* (2013.01); *F24F 3/14* (2013.01); *F25B 19/00* (2013.01); *F25B 15/16* (2013.01);
(Continued)

(58) Field of Classification Search
CPC . G03B 21/16; G03B 33/12; F24F 3/14; F25B 19/00; F25B 15/16; F25B 17/00; F25B 23/006
See application file for complete search history.

(56) References Cited

U.S. PATENT DOCUMENTS

| 6,615,603 B2 | 9/2003 | Tanaka et al. |
| 7,891,819 B2 * | 2/2011 | Osumi .................. G03B 21/16 349/58 |

(Continued)

FOREIGN PATENT DOCUMENTS

| JP | 2002-100891 A | 4/2002 |
| JP | 2002-107698 A | 4/2002 |

(Continued)

*Primary Examiner* — Cara E Rakowski
*Assistant Examiner* — Magda Cruz
(74) *Attorney, Agent, or Firm* — Oliff PLC

(57) ABSTRACT

A projector a cooler configured to cool a cooling target based on transformation of a refrigerant into a gas. The cooler includes a refrigerant generator configured to generate the refrigerant and a refrigerant sender configured to send the generated refrigerant toward the cooling target. The refrigerant generator includes a moisture absorbing/discharging member, a first air blower configured to deliver air outside the projector to the moisture absorbing/discharging member, a heat exchanger connected to the refrigerant sender, a heater configured to heat the moisture absorbing/discharging member, and a second air blower configured to deliver, to the heat exchanger, air around a portion of the moisture absorbing/discharging member that is the portion heated by the heater. The heat exchanger, by cooling the air having flowed into the heat exchanger, generates the refrigerant from the air having flowed into the heat exchanger. The moisture absorbing/discharging member is fixed.

13 Claims, 11 Drawing Sheets

(51) Int. Cl.
*F25B 19/00* (2006.01)
*F25B 15/16* (2006.01)
*G03B 33/12* (2006.01)
*F25B 23/00* (2006.01)
*F25B 17/00* (2006.01)

(52) U.S. Cl.
CPC ............ *F25B 17/00* (2013.01); *F25B 23/006* (2013.01); *G03B 33/12* (2013.01)

(56) References Cited

U.S. PATENT DOCUMENTS

| | | | |
|---|---|---|---|
| 8,517,540 B2 | 8/2013 | Terao | |
| 8,550,633 B2* | 10/2013 | Utsunomiya | G02B 27/48 349/64 |
| 9,857,671 B2* | 1/2018 | Asano | F21V 29/65 |
| 10,184,699 B2* | 1/2019 | Shedd | F25B 23/006 |
| 10,514,594 B2* | 12/2019 | Okada | G03B 21/16 |
| 2002/0092315 A1 | 7/2002 | Tanaka et al. | |
| 2002/0191159 A1* | 12/2002 | Nagao | H04N 9/3105 353/54 |
| 2005/0220156 A1* | 10/2005 | Kitabayashi | G02F 1/133385 372/35 |
| 2010/0118279 A1* | 5/2010 | Itsuki | G03B 21/16 353/54 |
| 2011/0242499 A1 | 10/2011 | Terao | |
| 2017/0214892 A1* | 7/2017 | Nagatani | G03B 21/16 |

FOREIGN PATENT DOCUMENTS

| | | |
|---|---|---|
| JP | 2002-115868 A | 4/2002 |
| JP | 2002-224530 A | 8/2002 |
| JP | 2002-267306 A | 9/2002 |
| JP | 2002-372748 A | 12/2002 |
| JP | 2007-294655 A | 11/2007 |
| JP | 2009-224406 A | 10/2009 |
| JP | 2010-107751 A | 5/2010 |
| JP | 2011-215457 A | 10/2011 |
| JP | 2013-198861 A | 10/2013 |
| JP | 2015-033937 A | 2/2015 |

* cited by examiner

PROJECTOR HAVING REFRIGERANT GENERATOR

BACKGROUND

1. Technical Field

The present invention relates to a projector.

2. Related Art

To cool a projector, there is, for example, a proposed air-cooling cooler using an air blower (see JP-A-2002-107698, for example), a liquid-cooling cooler using a pump that delivers a refrigerant liquid and a pipe through which the refrigerant liquid passes (see JP-A-2007-294655, for example).

In recent years, increase in luminance of light outputted from a projector and other factors increase the amount of heat produced by a cooling target to be cooled by a cooler, and improvement in the cooling performance of the cooler is therefore required. To improve the cooling performance of the coolers using, for example, air-cooling or liquid-cooling described above, however, the coolers are enlarged, resulting in a problem of an increase in the size of the projector. Further, in the case of the air-cooling, there is also a problem of an increase in noise produced by the air blower.

SUMMARY

An advantage of some aspects of the invention is to provide a projector including a cooler that not only excels in cooling performance but is compact and excels in quietness.

A projector according to an aspect of the invention is a projector including a light source device configured to emit light, a light modulator configured to modulate the light emitted from the light source device in accordance with an image signal, a projection optical device configured to project the light modulated by the light modulator, and a cooler configured to cool a cooling target based on transformation of a refrigerant into a gas. The cooler includes a refrigerant generator configured to generate the refrigerant and a refrigerant sender configured to send the generated refrigerant toward the cooling target. The refrigerant generator includes a moisture absorbing/discharging member, a first air blower configured to deliver air outside the projector to the moisture absorbing/discharging member, a heat exchanger connected to the refrigerant sender, a heater configured to heat the moisture absorbing/discharging member, and a second air blower configured to deliver, to the heat exchanger, air around a portion of the moisture absorbing/discharging member that is a portion heated by the heater. The heat exchanger, by cooling the air having flowed into the heat exchanger, generates the refrigerant from the air having flowed into the heat exchanger. The moisture absorbing/discharging member is fixed.

In the projector according to the aspect of the invention, the cooler is so configured that the refrigerant sender sends the refrigerant generated by the refrigerant generator to the cooling target and transformation of the refrigerant into a gas, which is an endothermic reaction, can be used to draw heat from the cooling target to cool the cooling target. The cooling based on the transformation of the refrigerant into a gas can actively draw heat from the cooling target and therefore has excellent cooling performance as compared with air cooling and liquid cooling, in which the cooling target is cooled based merely on heat transfer to a refrigerant. Therefore, to provide the same cooling performance as that provided by air cooling or liquid cooling, the overall size of the cooler is readily reduced as compared with the size required by air cooling or liquid cooling.

Further, in the cooling based on the transformation of the refrigerant into a gas, the cooling performance can be improved by an increase in the surface area where the refrigerant that is transformed into a gas comes into contact with the cooling target. The increase in the cooling performance of the cooler therefore does not cause an increase in noise. The projector according to the aspect of the invention can therefore be configured to excel in cooling performance, have a compact size, and excel in quietness.

In the projector according to the aspect of the invention, in which the refrigerant generator can generate the refrigerant, a user's convenience can be improved because the user does not need to replenish the refrigerant. Since the refrigerant generator can generate a necessary amount of refrigerant as necessary, the refrigerant does not need to be stored, for example, in a storage tank, whereby the weight of the projector can be reduced.

In the projector according to the aspect of the invention, the moisture absorbing/discharging member can absorb water vapor contained in the air delivered from the first air blower, and the moisture absorbed by the moisture absorbing/discharging member can be discharged in the form of water vapor into the air delivered by the second air blower. The heat exchanger can then condense the moisture discharged in the form of water vapor into the air to generate the refrigerant. The refrigerant can therefore be generated from the atmosphere in the projector.

In the projector according to the aspect of the invention, the moisture absorbing/discharging member is fixed. Therefore, for example, no driver that rotates the moisture absorbing/discharging member needs to be provided, whereby the electric power consumed by the refrigerant generator can be reduced. Further, since the first air blower delivers air outside the projector to the moisture absorbing/discharging member, an intake fan of the projector can be used as the first air blower. The refrigerant can therefore be generated with no air blower separately provided. An increase in the number of parts of the projector can therefore be avoided. Since an increase in the number of air blowers can be avoided, an increase in noise produced by the projector can be avoided.

The moisture absorbing/discharging member may be formed by layering a first layer through which air passes through in a first direction and a second layer through which air passes through in a second direction that intersects the first direction. The first air blower may be configured to cause air to pass through the first layer in the first direction, and the second air blower may be configured to cause air to pass through the second layer in the second direction to deliver the air to the heat exchanger.

According to the configuration described above, the channel through which the air passing through the moisture absorbing/discharging member in the first direction flows and the channel through which the air passing through the moisture absorbing/discharging member in the second direction flows can be separate from each other. Therefore, the two different types of air are allowed to pass through the moisture absorbing/discharging member but are not allowed to mix with each other. The configuration described above can prevent the air outside the projector, such as the air delivered from the first air blower, from mixing with the air delivered from the second air blower, whereby a decrease in the humidity of the air delivered from the second air blower can be avoided. Cooling the heat exchanger therefore allows the refrigerant to be preferably generated. Further, a situation in which foreign matter contained in the air outside the projector mixes with the air in the projector can be avoided.

The first layer may be formed of a plurality of first layers, and the second layer may be formed of a plurality of second layers. The moisture absorbing/discharging member may be formed by alternately layering the first layers and the second layers on each other.

According to the configuration described above, the moisture absorbed by the first layers when the air from the first air blower passes therethrough readily moves into the second layers adjacent to the first layers. The state in which the second layers contain moisture is therefore readily achieved, and causing the air from the second air blower to pass through the second layers readily causes the water vapor to be discharged into the air. The air delivered from the second air blower and delivered to the heat exchanger therefore preferably contains moisture, whereby the refrigerant can be preferably generated.

The heat exchanger may be cooled by air having been exhausted from the first air blower and having passed through the first layer.

According to the configuration described above, no cooling section that cools the heat exchanger needs to be separately provided, whereby an increase in the number of parts of the projector can be avoided. Further, an increase in noise produced by the projector can be avoided unlike in a case where an air blower is separately provided as the cooling section that cools the heat exchanger.

The refrigerant generator may include a moisture absorbing/discharging channel in which the moisture absorbing/discharging member is fixed, a first channel having a first opening continuous with the moisture absorbing/discharging channel, a second channel having a second opening continuous with the moisture absorbing/discharging channel, and a channel switcher configured to close one of the first opening and the second opening in a switchable manner. The first air blower may deliver air toward the first opening through the first channel, and the second air blower may deliver air toward the second opening through the second channel. In a case where the channel switcher closes the second opening and the first opening is opened, the air delivered from the first air blower may flow into the moisture absorbing/discharging channel via the first opening and pass through the moisture absorbing/discharging member. In a case where the channel switcher closes the first opening and the second opening is opened, the air delivered from the second air blower may flow into the moisture absorbing/discharging channel via the second opening, pass through the moisture absorbing/discharging member, and flow into the heat exchanger.

According to the configuration described above, the channel switcher can switch the state in which the first opening is closed and the second opening is open to the state in which the first opening is open and the second opening is closed and vice versa and can therefore switch the air flowing into the moisture absorbing/discharging channel between the air from which the moisture absorbing/discharging member absorbs moisture and the air into which the moisture absorbing/discharging member discharges moisture. Therefore, causing the moisture absorbing/discharging member fixed in the moisture absorbing/discharging channel to alternately and repeatedly absorb and discharge moisture allows generation of the refrigerant.

Further, since the channel to be continuous with the moisture absorbing/discharging channel can be switched to the first channel or the second channel, the first channel, through which the air from the first air blower flows, does not need to be continuous with the moisture absorbing/discharging channel when the second channel, through which the air from the second air blower flows, is continuous with the moisture absorbing/discharging channel. Therefore, in the case where the second channel, through which the air from the second air blower flows, is caused to continuous with the moisture absorbing/discharging channel to form a circulation path through which the air circulates, the circulation path is readily sealed. A decrease in the humidity of the air delivered from the second air blower can therefore avoided, whereby the refrigerant can be preferably generated. Further, entry of foreign matter into the circulation path can also be avoided.

The channel switcher may close the first opening or the second opening based on both a flow rate of the air delivered from the first air blower toward the first opening and a flow rate of the air delivered from the second air blower toward the second opening.

According to the configuration described above, the air flowing into the moisture absorbing/discharging channel can therefore be appropriately selected in accordance with the flow rate of the air exhausted from each of the air blowers.

The channel switcher may close the second opening when the flow rate of the air delivered from the first air blower toward the first opening is greater than the flow rate of the air delivered from the second air blower toward the second opening, and the channel switcher may close the first opening when the flow rate of the air delivered from the second air blower toward the second opening is greater than the flow rate of the air delivered from the first air blower toward the first opening.

According to the configuration described above, the difference in the flow rate between the two types of air can be used to apply force to the channel switcher to readily cause the state of the channel switcher to switch from one to the other. No driver or any other component for causing the state of the channel switcher to switch from one to the other therefore needs to be provided, whereby the electric power consumed by the refrigerant generator can be reduced.

In a case where the channel switcher closes the second opening and the first opening is opened, the air delivered from the first air blower may pass through the moisture absorbing/discharging member and may be delivered to the cooling target.

According to the configuration described above, the cooling target is readily further cooled.

The first air blower and the second air blower may be so controlled that a sum of a flow rate of the air exhausted from the first air blower and a flow rate of the air exhausted from the second air blower is fixed.

According to the configuration described above, the magnitude of noise produced by the first air blower and the second air blower is readily fixed. Therefore, controlling the first air blower and the second air blower to cause the channel switcher to perform the switching operation described above causes no variation in the magnitude of the noise.

The refrigerant generator may further include a third air blower configured to cool the heat exchanger.

According to the configuration described above, the third air blower can readily cool the heat exchanger without routing the air exhausted from the first air blower.

The third air blower may be controlled based on the switching operation performed by the channel switcher.

According to the configuration described above, for example, in the case where the channel switcher closes the first opening and opens the second opening, the third air blower exhausts air to cool the heat exchanger, whereas in the case where the channel switcher closes the second opening and opens the first opening, the third air blower can be stopped. Therefore, in the case where the air from the second air blower flows into the heat exchanger, the third air blower can be selectively driven. The electric power consumed by the third air blower can therefore be reduced. Further, in the case where the moisture absorbing/discharging member absorbs moisture from the air from the first air blower, stopping the third air blower causes no noise to be produced by the third air blower, whereby noise produced by the projector can be reduced.

The second air blower may be configured to cause air to pass through the moisture absorbing/discharging member to deliver the air to the heat exchanger, and the heater may include a heating main body configured to heat the air before passing through the moisture absorbing/discharging member and the second air blower.

According to the configuration described above, the heater, in which the second air blower delivers air to the moisture absorbing/discharging member, can heat the moisture absorbing/discharging member. The heater can therefore heat the moisture absorbing/discharging member even in the configuration in which the heating main body is located in a position separate from the moisture absorbing/discharging member. The heater can therefore be configured with improved flexibility.

The refrigerant generator may have a circulation path through which the air exhausted from the second air blower circulates, and the circulation path may pass through the moisture absorbing/discharging member and the heat exchanger.

According to the configuration described above, configuring the circulation path as a sealed path can prevent the air outside the projector from entering the circulation path, whereby the humidity of the air delivered to the heat exchanger is readily maintained relatively high. Cooling the heat exchanger therefore allows the refrigerant to be preferably generated.

In the projector according to the aspect of the invention, the two different types of air are allowed to pass through the moisture absorbing/discharging member with the channels through which the two different types of air flow separate from each other, as described above. Therefore, even in the configuration in which the circulation path is sealed, the air from the first air blower and the air from the second air blower are allowed to pass through the moisture absorbing/discharging member. The humidity of the air can therefore be more preferably maintained by precisely sealing the circulation path. Cooling the heat exchanger therefore allows the refrigerant to be more preferably generated. The precise sealing of the circulation path further prevents entry of foreign matter into the circulation path in a more exact sense.

BRIEF DESCRIPTION OF THE DRAWINGS

The invention will be described with reference to the accompanying drawings, wherein like numbers reference like elements.

DESCRIPTION OF EXEMPLARY EMBODIMENTS

Projectors according to embodiments of the invention will be described below with reference to the drawings. The scope of the invention is not limited to the following embodiments and can be arbitrarily changed within the scope of the technical idea of the invention. In the following drawings, for clarity of each configuration, the scale, the number, and other factors of the structure of the configuration differ from the scale, the number, and the other factors of an actual structure in some cases.

First Embodiment

Figure 1:
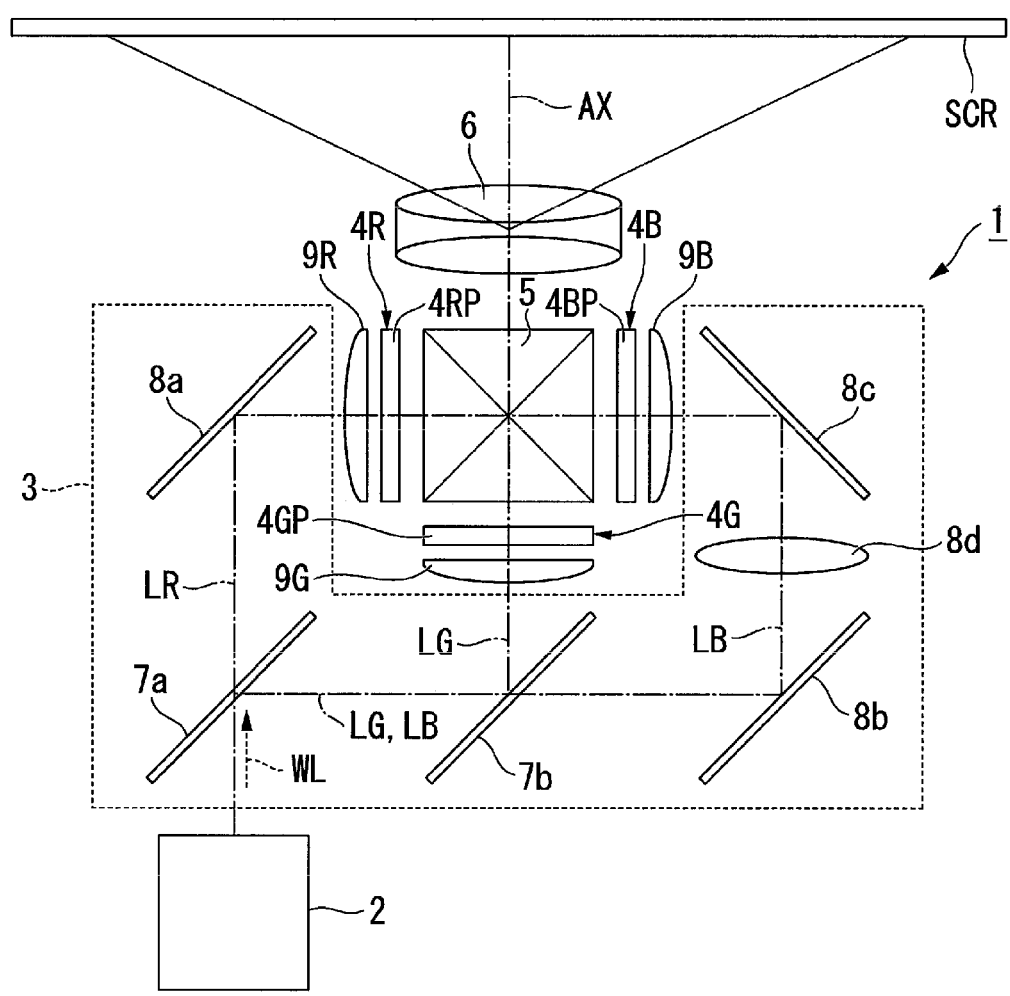
FIG. 1 is a schematic configuration diagram showing a projector according to a first embodiment.
Figure 2:
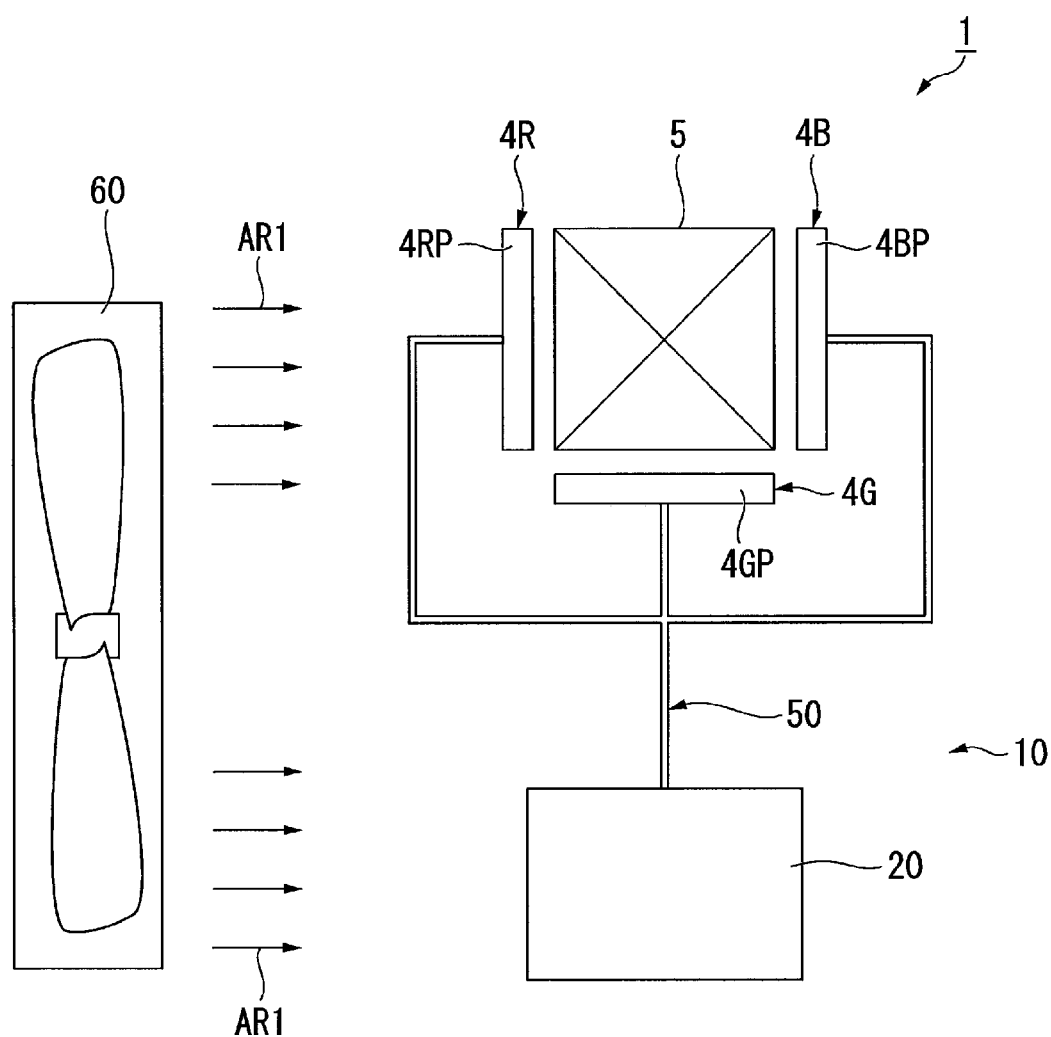
FIG. 2 is a diagrammatic view showing part of the projector according to the first embodiment.

FIG. 1 is a schematic configuration diagram showing a projector 1 according to the present embodiment. FIG. 2 is a diagrammatic view showing part of the projector 1 according to the present embodiment. The projector 1 includes a light source device 2, a color separation system. 3, light modulation units 4R, 4G, and 4B, a light combining system 5, and a projection optical device 6, as shown in FIG. 1. The light modulation unit 4R includes a light modulator 4RP. The light modulation unit 4G includes a light modulator 4GP. The light modulation unit 4B includes a light modulator 4BP.

The light source device 2 outputs illumination light WL, which is so adjusted to have a roughly uniform illuminance distribution, toward the color separation system 3. The light source device 2 includes, for example, a semiconductor laser as a light source. The color separation system 3 separates the illumination light WL from the light source device 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source device 2 into the red light LR and light containing the green light LG and the blue light LB mixed with each other. The first dichroic mirror 7a is characterized in that it transmits the red light LR and reflects the green light LG and the blue light LB. The second dichroic mirror 7b separates the light containing the green light LG and the blue light LB mixed with each other into the green light LG and the blue light LB. The second dichroic mirror 7b is characterized in that it reflects the green light LG and transmits the blue light LB.

The first reflection mirror 8a is disposed in the light path of the red light LR and reflects the red light LR having passed through the first dichroic mirror 7a toward the light modulator 4RP. The second reflection mirror 8b and the third reflection mirror 8c are disposed in the light path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light from the light source device 2 in accordance with an image signal. The light modulator 4GP modulates the green light LG out of the light from the light source device 2 in accordance with an image signal. The light modulator 4BP modulates the blue light LB out of the light from the light source device 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a roughly cubic shape. The light combining system 5 combines the color image light fluxes from the light modulators 4RP, 4GP, and 4BP with one another. The light combining system 5 outputs the combined image light toward the projection optical device 6. The projection optical device 6 is formed of a group of projection lenses. The projection optical device 6 enlarges the combined image light from the light combining system 5, that is, the light fluxes modulated by the light modulators 4RP, 4GP, and 4BP and projects the enlarged image light toward a screen SCR. An enlarged color image (video images) is thus displayed on the screen SCR.

The projector 1 further includes a cooler 10, as shown in FIG. 2. The cooler 10, in which a refrigerant W is transformed into a gas, cools a cooling target provided in the projector 1. In the present embodiment, the refrigerant W is, for example, liquid water. In the following description, the transformation of the refrigerant W into a gas is therefore simply called vaporization in some cases. In the present embodiment, the cooling target includes the light modulation units 4R, 4G, and 4B.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target (light modulation units 4R, 4G, and 4B in the present embodiment) vaporizes so as to be capable of drawing heat from the cooling target, whereby the cooler 10 can cool the cooling target. The refrigerant generator 20 and the refrigerant sender 50 will be described below in detail.

Figure 3:
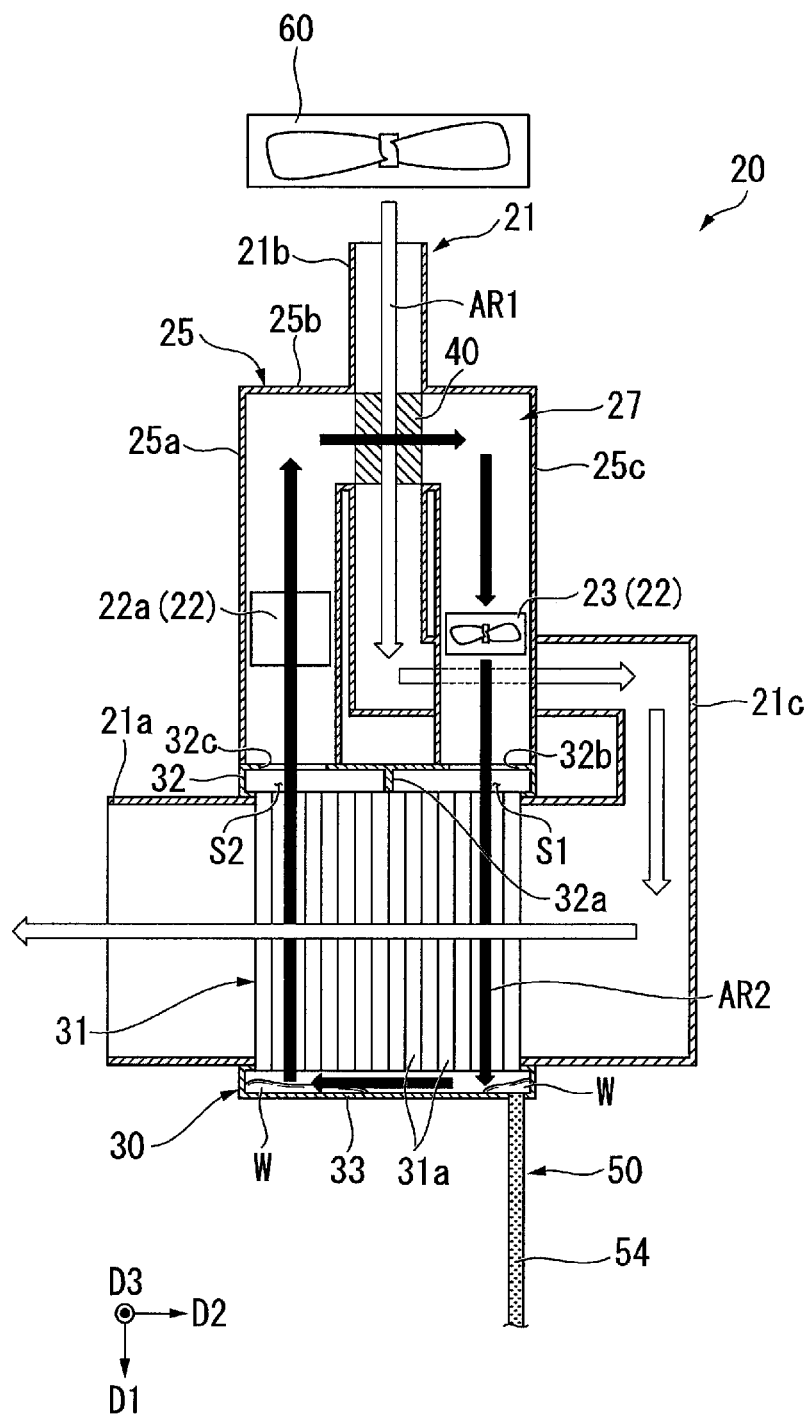
FIG. 3 is a schematic configuration diagram diagrammatically showing a refrigerant generator in the first embodiment.
Figure 4:
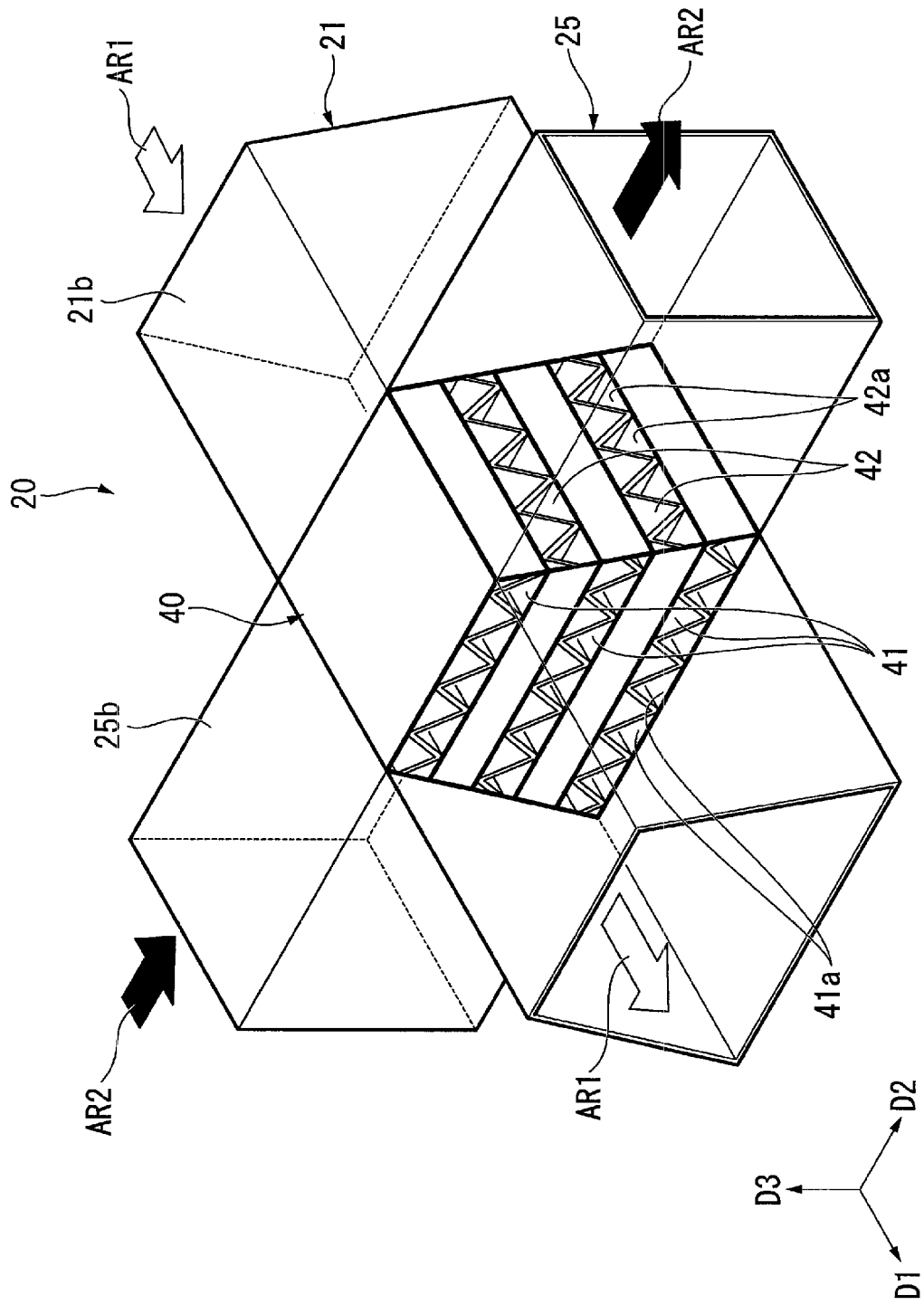
FIG. 4 is a perspective view showing part of the refrigerant generator in the first embodiment.

FIG. 3 is a schematic configuration diagram diagrammatically showing the refrigerant generator 20 in the present embodiment. FIG. 4 is a perspective view showing part of the refrigerant generator 20. The refrigerant generator 20 includes a circulation duct 25, a moisture absorbing/discharging member 40, a first air blower 60, a heat exchanger 30, a heater 22, a second air blower 23, and a moisture absorbing duct 21, as shown in FIGS. 3 and 4.

In the following description, the direction parallel to an axis D1 shown in the drawings as appropriate is called a "first direction D1," the direction parallel to an axis D2 shown in the drawings as appropriate is called a "second direction D2," and the direction parallel to an axis D3 shown in the drawings as appropriate is called a "third direction D3." The first direction D1, the second direction D2, and the third direction D3 are perpendicular to one another.

The circulation duct 25 includes a heating channel 25a, a moisture discharging channel 25b, and an air blowing channel 25c, as shown in FIG. 3. The heating channel 25a extends in the first direction D1. An end of the heating channel 25a that is the end on one side in the first direction D1 (+D1 side) is provided with an inlet of the circulation duct 25, and the inlet is continuous with a communication hole 32c in a first lid 32, which will be described later.

The moisture discharging channel 25b extends from an end of the heating channel 25a that is the end on the other side in the first direction D1 (−D1 side) toward one side in the second direction D2 (+D2 side). The moisture discharging channel 25b has, for example, a rectangular cross-sectional shape perpendicular to the second direction D2, as shown in FIG. 4. The air blowing channel 25c extends from an end of the moisture discharging channel 25b that is the end on the one side in the second direction D2 toward the one side in the first direction D1, as shown in FIG. 3. An end of the air blowing channel 25c that is the end on the one side in the first direction D1 is provided with an outlet of the circulation duct 25, and the outlet is continuous with a communication hole 32b in the first lie 32, which will be described later.

Figure 5:
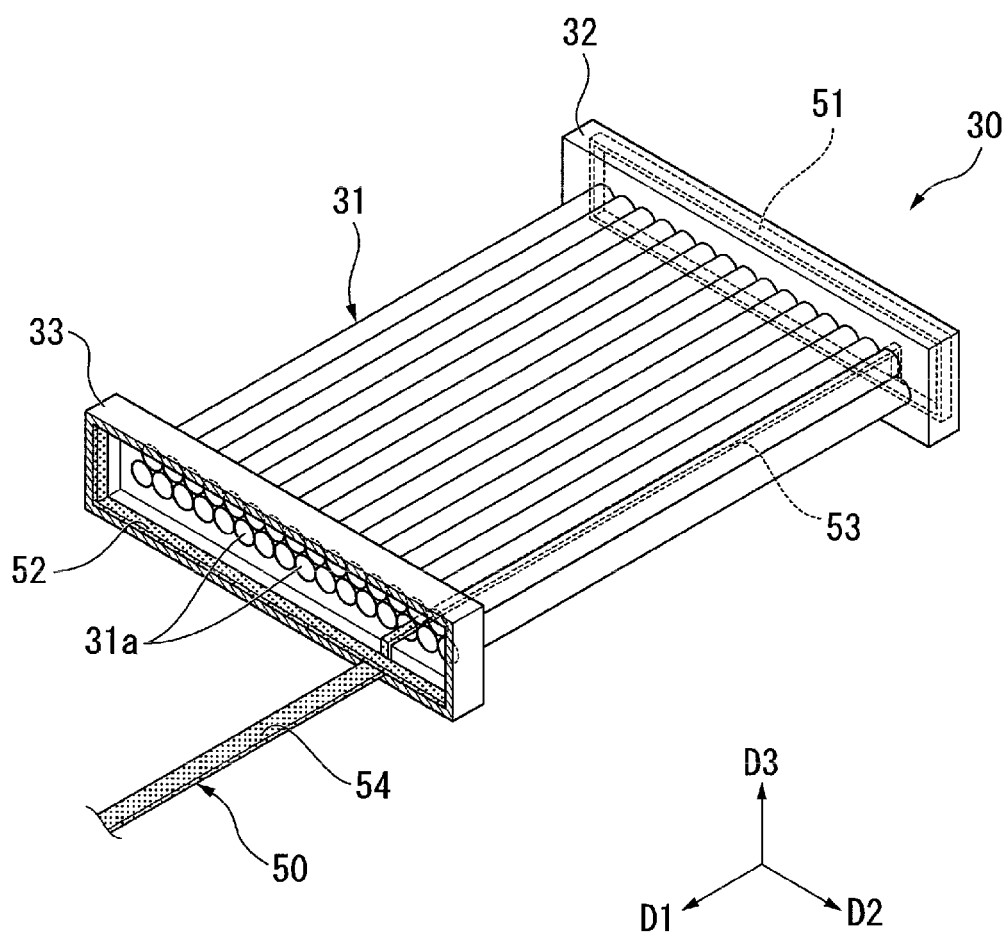
FIG. 5 is a partial cross-sectional perspective view showing a heat exchanger in the first embodiment.

The heat exchanger 30 is a portion that generates the refrigerant W. FIG. 5 is a partial cross-sectional perspective view showing the heat exchanger 30. The heat exchanger 30 includes a flow passage section 31, the first lid 32, and a second lid 33, as shown in FIG. 5. The flow passage section 31 includes a plurality of pipes 31a, which each have a tubular shape and extend in the first direction D1. The pipes 31a each open at the opposite ends thereof in the first direction D1. The pipes 31a each have, for example, a circular cross-sectional shape perpendicular to the first direction D1.

In the present embodiment, the flow passage section 31 is formed by layering a plurality of layers, which are each formed of a plurality of pipes 31a arranged in the second direction D2, on each other in the third direction D3. In the present embodiment, the dimension of the flow passage section 31 in the third direction D3 is, for example, smaller than the dimension of the flow passage section 31 in the second direction D2 and is the smallest of the dimensions of the flow passage section 31 in the directions perpendicular to the first direction D1.

The first lid 32 is connected to an end of the flow passage section 31 that is the end on the other side in the first direction D1 (−D1 side). The first lid 32 has the shape of a rectangular parallelepiped elongated in the second direction D2. One end of each of the pipes 31a in the first direction D1 opens in the first lid 32. A partition 32a is provided in the first lid 32, as shown in FIG. 3. The partition 32a partitions the interior of the first lid 32 into a first space S1 and a second space S2 disposed side by side in the second direction D2. In FIG. 3, the first space S1 is located on the right of the second space S2 (+D2 side).

The communication hole 32b, which allows the first space S1 to be continuous with the interior of the air blowing channel 25c of the circulation duct 25, is formed in the first lid 32. The communication hole 32c, which allows the second space S2 to be continuous with the interior of the heating channel 25a of the circulation duct 25, is formed in the first lid 32.

The second lid 33 is connected to an end of the flow passage section 31 that is the end on the one side in the first direction D1 (+D1 side), that is, the end opposite the end to which the first lid 32 is connected. The second lid 33 has the shape of a rectangular parallelepiped elongated in the second direction D2, as shown in FIG. 5. The other end of each of the pipes 31a in the first direction D1 opens in the second lid 33. The interior of the second lid 33 is not partitioned, unlike the first lid 32. The interior of the second lid 33 is continuous with the first space S1 and the second space S2 in the first lid 32 via the interior of the pipes 31a of the flow passage section 31. The second lid 33 is connected to the refrigerant sender 50. The heat exchanger 30 is thus connected to the refrigerant sender 50. In FIG. 5, a wall of the second lid 33 that is the wall located on the one side in the first direction D1 is omitted.

The moisture absorbing duct 21 includes a moisture absorbing channel 21b, a cooling channel 21a, and a connecting channel 21c, as shown in FIG. 3. The moisture absorbing channel 21b extends in the first direction D1. The moisture absorbing channel 21b intersects the moisture discharging channel 25b of the circulation duct 25, as shown in FIGS. 3 and 4. An end of the moisture absorbing channel 21b that is the end on the other side in the first direction (−D1 side) is open, as shown in FIG. 3. The opening of the moisture absorbing channel 21b is an inlet of the moisture absorbing duct 21 that is the inlet into which air AR1 from the first air blower 60 flows. The moisture absorbing channel 21b has, for example, a trapezoidal cross-sectional shape perpendicular to the first direction D1, as shown in FIG. 4.

The cooling channel 21a extends in the second direction D2, as shown in FIG. 3. An end of the cooling channel 21a that is the end on the other side in the second direction (−D2 side) is open. The opening of the cooling channel 21a is, for example, an outlet of the moisture absorbing duct 21. The flow passage section 31 of the heat exchanger 30 is so disposed in the cooling channel 21a as to pass therethrough in the first direction D1. The flow passage section 31 is thus disposed in the cooling channel 21a. The connecting channel 21c allows the moisture absorbing channel 21b to be continuous with the cooling channel 21a.

In the present embodiment, the moisture absorbing/discharging member 40 is a columnar member having a trapezoidal cross-sectional shape and extending in the first direction D1 as shown in FIG. 4. The dimension of the moisture absorbing/discharging member 40 in the second direction D2 decreases with distance toward one side in the third direction D3 (+D3 side). The moisture absorbing/discharging member 40 is a porous member. The moisture absorbing/discharging member 40 absorbs and discharges moisture. The moisture absorbing/discharging member 40 is fixed in the portion where the circulation duct 25 and the moisture absorbing duct 21 intersect each other, that is, the portion where the moisture discharging channel 25b and the moisture absorbing duct 21b intersect each other. The moisture absorbing/discharging member 40 fills the portion where the moisture discharging channel 25b and the moisture absorbing channel 21b intersect each other and isolates the interior of the moisture discharging channel 25b and the interior of the moisture absorbing channel 21b from each other.

The moisture absorbing/discharging member 40 is formed by layering a first layer 41 and a second layer 42 on each other in the third direction D3. In the present embodiment, the first layer 41 is formed of a plurality of first layers 41, and the second layer 42 is formed of a plurality of second layers 42. In FIG. 4, three first layers 41 are, for example, provided, and two second layers 42 are, for example, provided. The moisture absorbing/discharging member 40 is formed by alternately layering the first layers 41 and the second layers 42 on each other.

The first layers 41 each have an innumerable number of through holes 41a, which pass through the first layer 41 in the first direction D1, and air can flow through the first layers 41 via the through holes 41a in the first direction D1. The opposite ends of each of the through holes 41a in the first direction D1 in each of the first layers 41 open in the moisture absorbing channel 21b. The second layers 42 each have an innumerable number of through holes 42a, which pass through the second layer 42 in the second direction D2, and air can flow through the second layers 42 via the through holes 42a in the second direction D2, which intersects the first direction D1. The opposite ends of each of the through holes 42a in the second direction D2 in each of the second layers 42 open in the moisture discharging channel 25b.

In the present embodiment, the moisture absorbing/discharging member 40 is formed, for example, by layering plate-shaped members each having through holes on each other with the orientation of the through holes alternately changed whenever a plate-shaped member is layered and applying a substance that absorbs and discharges moisture onto a surface of the layered plate-shaped members that is the surface exposed to the ambient environment. The surface of the layered plate-shaped members that is the surface exposed to the ambient environment includes the outer surface of the moisture absorbing/discharging member 40, the inner surfaces of the through holes 41a in the first layers 41, and the inner surfaces of the through holes 42a in the second layers 42. The moisture absorbing/discharging member 40 may instead be entirely made of a substance that absorbs and discharges moisture. An example of the substance that absorbs and discharges moisture may include zeolite.

The heater 22 includes a heating main body 22a, as shown in FIG. 3. The heating main body 22a is disposed in the circulation duct 25. In more detail, the heating main body 22a is disposed in the heating channel 25a of the circulation duct 25. The heating main body 22a is, for example, an electric heater. The heating main body 22a heats the atmosphere in the heating channel 25a. In the present embodiment, the heater 22 includes the second air blower 23.

The second air blower 23 is disposed in the circulation duct 25. In more detail, the second air blower 23 is disposed in the air blowing channel 25c of the circulation duct 25. The second air blower 23 is, for example, an axial fan. The second air blower 23 exhausts air sucked from the other side in the first direction D1 (−D1 side) toward the one side in the first direction D1 (+D1 side). The second air blower 23 delivers the air to the first space S1 via the communication hole 32b.

The air having flowed from the second air blower 23 into the heat exchanger 30 via the first space S1 passes through the pipes 31a continuous with the first space S1 out of the plurality of pipes 31a and flows into the second lid 33. The air having flowed into the second lid 33 passes through the pipes 31a continuous with the second space S2 out of the plurality of pipes 31a, flows into the second space S2, and flows into the heating channel 25a of the circulation duct 25 via the communication hole 32c. The air having flowed into the heating channel 25a flows into the air blowing channel 25c via the moisture discharging channel 25b and is sucked by the second air blower 23 again.

As described above, in the present embodiment, the refrigerant generator 20 has a circulation path 27, through which the air exhausted from the second air blower 23 circulates. The circulation path 27 is formed of at least the circulation duct 25 and the heat exchanger 30. The circulation path 27 passes through the heating main body 22a, the moisture absorbing/discharging member 40, and the heat exchanger 30. Since the interior of the circulation duct 25 and the interior of the moisture absorbing duct 21 are isolated from each other, as described above, the interior of the circulation path 27 is isolated from the interior of the moisture absorbing duct 21. The circulation path 27 is sealed, and there is therefore no entry of air outside of the circulation path 27 into the circulation path 27. In the following description, the air exhausted from the second air blower 23 and circulating through the circulation path 27 is called air AR2.

The second air blower 23 causes the air AR2 to circulate through the circulation path 27 to cause the air AR2 to pass through the second layers 42 in the second direction D2 in the moisture discharging channel 25b, as shown in FIG. 4, whereby the air AR2 is delivered to the heat exchanger 30. The air AR2 passes through the second layers 42 via the through holes 42a therein. The air AR2 before passing through the second layers 42 in the moisture absorbing/discharging member 40 passes through the heating channel 25a, where the air AR2 is heated by the heating main body 22a. That is, the heating main body 22a heats the air AR2 before passing through the moisture absorbing/discharging member 40.

As described above, in the present embodiment, the heater 22 is so configured that the second air blower 23 delivers the air heated by the heating main body 22a to the moisture absorbing/discharging member 40 to heat the moisture absorbing/discharging member 40. The second air blower 23 thus delivers air around a portion of the moisture absorbing/discharging member 40 that is the portion heated by the heater 22 to the heat exchanger 30.

The first air blower 60 is an intake fan that takes outside air into the projector 1. The first air blower 60 delivers the air AR1 also to the light modulation units 4R, 4G, and 4B, which are each the cooling target, as shown in FIG. 2. The first air blower 60 is not limited to a specific device and may be any device capable of delivering the air AR1, for example, an axial fan and a centrifugal fan.

The first air blower 60 delivers the air AR1 via the inlet of the moisture absorbing channel 21b into the moisture absorbing duct 21, as shown in FIG. 3. The air AR1 having flowed into the moisture absorbing channel 21b passes through the first layers 41 of the moisture absorbing/discharging member 40 in the first direction D1, as shown in FIG. 4. The air AR1 passes through the first layers 41 via the through holes 41a therein. As described above, the first air blower 60 delivers the air AR1 outside the projector 1 to the moisture absorbing/discharging member 40 t causes the air AR1 to pass through the first layers 41 in the first direction D1.

The air AR1 having passed through the first layers 41 flows into the cooling channel 21a via the connecting channel 21c, as shown in FIG. 3. The air AR1 passing through the cooling channel 21a is sprayed onto the outer surface of the flow passage section 31 and passes by the flow passage section 31 in the second direction D2. The flow section 31 is thus cooled by the air AR1. That is, the heat exchanger 30 is cooled by the air AR1 having been exhausted from the first air blower 60 and having passed through the first layers 41 of the moisture absorbing/discharging member 40. In FIG. 3, in the cooling channel 21a, the air AR1 passes by the flow section 31 from right to left.

When the air AR1 from the first air blower 60 is caused to pass through the first layers 41 of the moisture absorbing/discharging member 40, water vapor contained in the air AR1 is absorbed by the first layers 41 through the inner surfaces of the through holes 41a. The moisture absorbed by the first layers 41 penetrates into the moisture absorbing/discharging member 40 and further moves into the second layers 42, which are layered on the first layers 41. The air AR2 heated by the heating main body 22a and therefore having a relatively high temperature then passes through the second layers 42 of the moisture absorbing/discharging member 40. The second layers 42 are thus heated, so that the moisture absorbed by the second layers 42 is vaporized through the inner surfaces of the through holes 42a, and the vaporized moisture is discharged into the air AR2.

The air AR2 containing the water vapor absorbed from the air AR1 when the air AR2 passes through the second layers 42 of the moisture absorbing/discharging member 40 is delivered by the second air blower 23 to the heat exchanger 30. The air AR2 having flowed from the first space S1 into the heat exchanger 30 flows through the flow passage section 31. In more detail, the air AR2 flows through part of the pipes 31a of the flow passage section 31. The flow passage section 31 is externally cooled by the air AR1 flowing in the second direction D2 through the cooling channel 21a of the moisture absorbing duct 21.

When the flow passage section 31 is cooled, the air AR2 flowing through part of the pipes 31a and having a relatively high temperature is cooled, so that the water vapor contained in the air AR2 condenses into liquid water, that is, the refrigerant W. The heat exchanger 30, when cooled, thus generates the refrigerant W from the air AR2 having flowed into the heat exchanger 30.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, third catchers 53, and a connector 54, as shown in FIG. 5.

The first catcher 51 is fixed to an edge portion of the inner surface of the first lid 32 that is the edge portion facing the other side in the first direction D1 (−D1 side). The first catcher 51 has a thin-band-like shape and is formed in a rectangular-frame-like shape extending along the edge portion of the first lid 32. The second catcher 52 is fixed to an edge portion of the inner surface of the second lid 33 that is the edge portion facing the one side in the first direction D1 (+D1 side). The second catcher 52 has a thin-band-like shape and is formed in a rectangular-frame-like shape extending along the edge portion of the second lid 33.

The third catchers 53 extend from the first catcher 51, pass through the pipes 31a, and reach the second catcher 52, so that the third catchers 53 connect the first catcher 51 to the second catcher 52. The third catchers 53 each have a thin-band-like shape extending in the first direction D1.

The connector 54 is a portion that connects the refrigerant generator 20 to the cooling target. In the present embodiment, the connector 54 is connected to the second catcher 52 and extends from the interior of the second lid 33, passes through the wall of the second lid 32, and protrudes out of the second lid 33. The connector 54, which protrudes out of the second lid 33, extends to the light modulation unit 4G, which is the cooling target (see FIG. 6). The connector 54 has a thin-band-like shape. The width of the connector 54 is, for example, greater than the width of the first catcher 51, the width of the second catcher 52, and the width of the third catchers 53.

The light modulation units 4R, 4G, and 4B, which are each the cooling target in the present embodiment, will next be described in more detail. In the following description, it is assumed that an upward/downward direction PZ having a positive side being the upper side and a negative side being the lower side is drawn as appropriate in the form of an axis PZ. The direction parallel to an optical axis AX of a projection lens of the projection optical device 6 that is the projection lens closest to the light exiting side, that is, the direction parallel to the direction in which the projection optical device 6 projects light is called an "optical axis direction PX" and is drawn as appropriate in the form of an axis PX. The optical axis direction PX is perpendicular to the upward/downward direction PZ. The direction perpendicular to both the optical axis direction PX and the upward/downward direction PZ is called a "width direction PY" and is drawn as appropriate in the form of an axis PY.

The upward/downward direction PZ and the upper and lower sides are merely names for describing the relative positional relationship among the portions of the projector, and an actual arrangement and other factors of the portions may differ from the arrangement and other factors indicated by the names.

Figure 6:
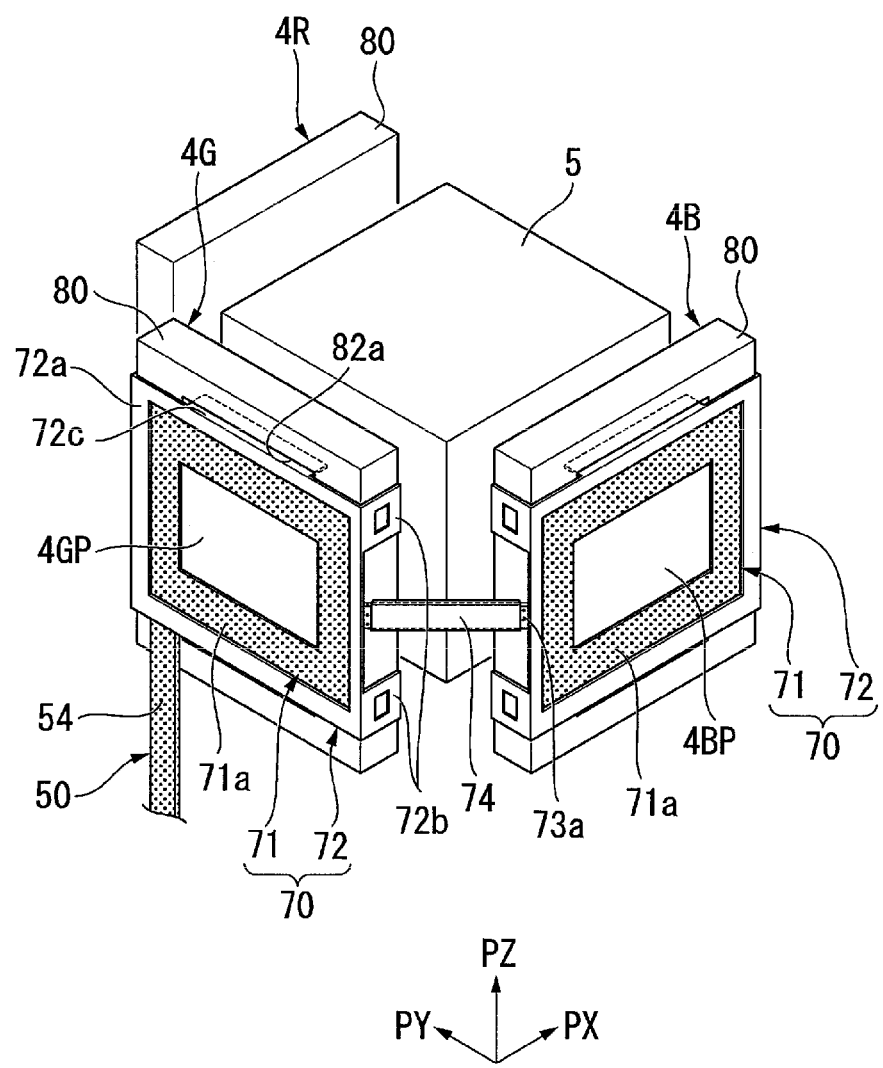
FIG. 6 is a perspective view showing light modulation units and a light combining system in the first embodiment.
Figure 7:
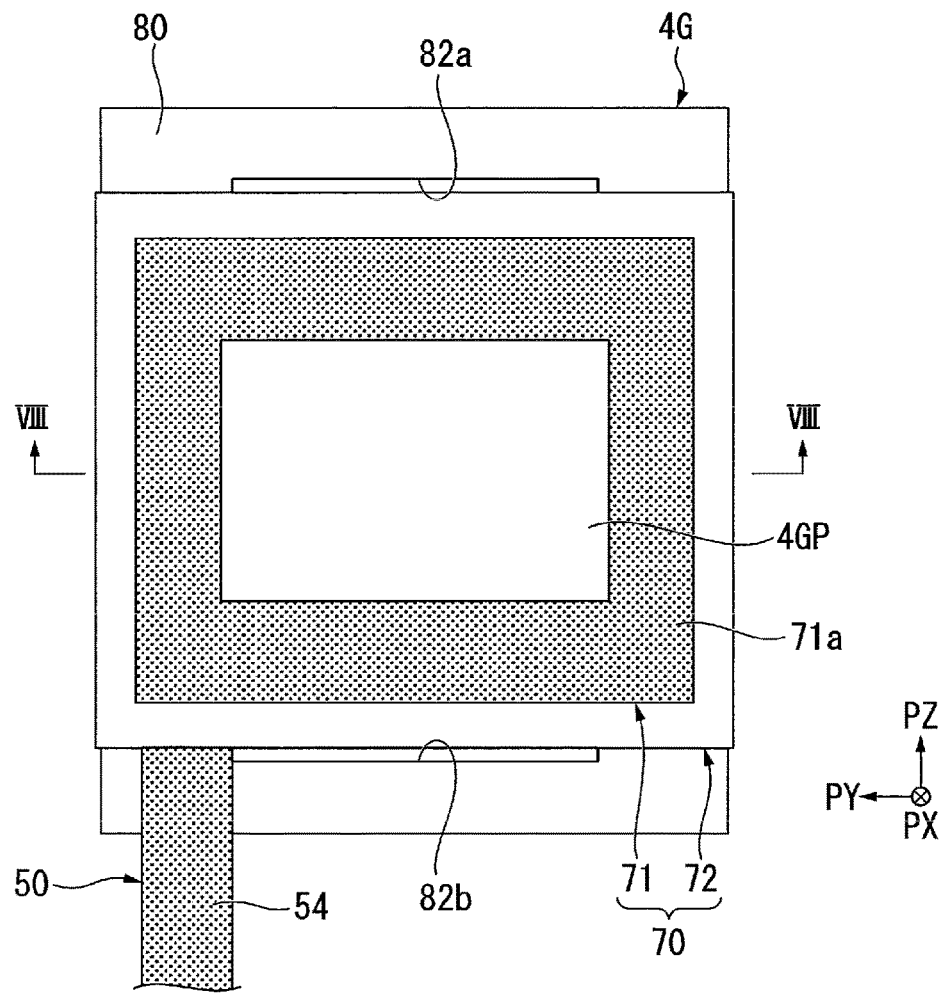
FIG. 7 shows one of the light modulation units in the first embodiment viewed from the light incident side.
Figure 8:
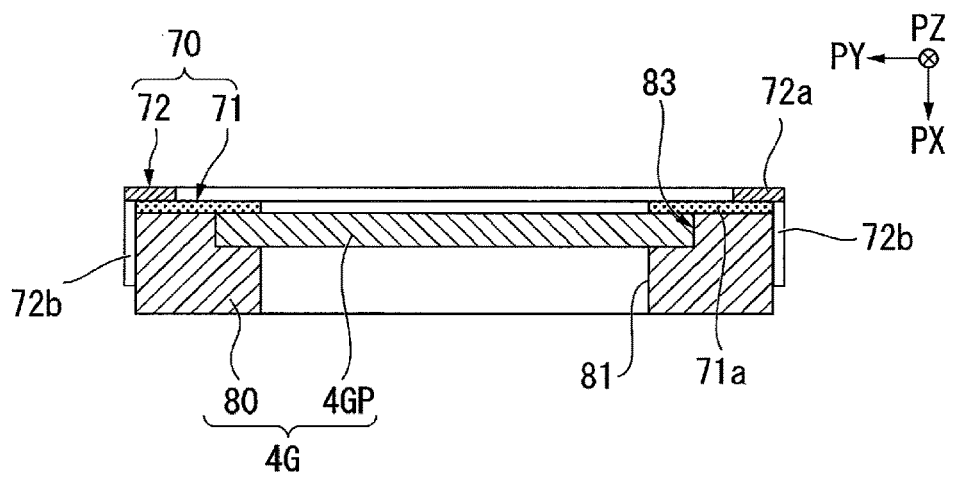
FIG. 8 is a cross-sectional view of the one light modulation unit in the first embodiment taken along the line VIII-VIII in FIG. 7.

FIG. 6 is a perspective view showing the light modulation units 4R, 4G, and 4B and the light combining system 5. FIG. 7 shows the light modulation unit 4G viewed from the light incident side. FIG. 8 is a cross-sectional view of the light modulation unit 4G taken along the line VIII-VIII in FIG. 7.

The light modulation units 4R, 4G, and 4B, which are each the cooling target, are so disposed as to surround the light combining system 5, as shown in FIG. 6. The light modulation units 4R and 4B are so disposed on the opposite sides of the light combining system 5 as to sandwich the light combining system 5 in the width direction PY. The light modulation unit 4G is disposed on the light incident side (−PX side) of the light combining system 5 in the optical axis direction PX. The light modulation units 4R, 4G, and 4B have the same structure except that they are disposed in different positions and take different attitudes, and only the light modulation unit 4G will therefore be representatively described below in some cases.

The light modulation unit 4G includes a holding frame 80, which holds the light modulator 4GP. The holding frame 80 has the shape of a roughly rectangular parallelepiped that is flat in the direction in which light is incident on the light modulator 4GP and elongated in the upward/downward direction PZ, as shown in FIGS. 6 to 8. The direction in which light is incident on the light modulator 4GP is, for example, the optical axis direction PX.

The holding frame 80 has a through hole 81, which passes through the holding frame 80 in the light incident direction, as shown in FIG. 8. A stepped section 83, where the width of the through hole 81 increases, is provided along an edge of the through hole 81 that is the edge on the light incident side (−PX side in FIG. 8). The light modulator 4GP is so held by the holding frame 80 as to be fit into the stepped section 83. Insertion grooves 82a and 82b are formed through a surface of the holding frame 80 that is the surface facing the light incident side and in portions on the opposite sides of the holding frame 80 in the upward/downward direction PZ, as shown in FIG. 7.

The projector 1 further includes a cooling facilitator 70 provided as part of the light modulation unit 4G, which is the cooling target, as shown in FIGS. 6 to 8. The cooling facilitator 70 includes a refrigerant holder 71 and a fixing member 72. The refrigerant holder 71 is attached to the surface of the holding frame 80, which holds the light modulation unit 4G, which is the cooling target. In the present embodiment, the refrigerant holder 71 is provided on a surface of the holding frame 80 that is the surface facing the side toward which light is incident on the light modulator 4GP (−PX side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 9:
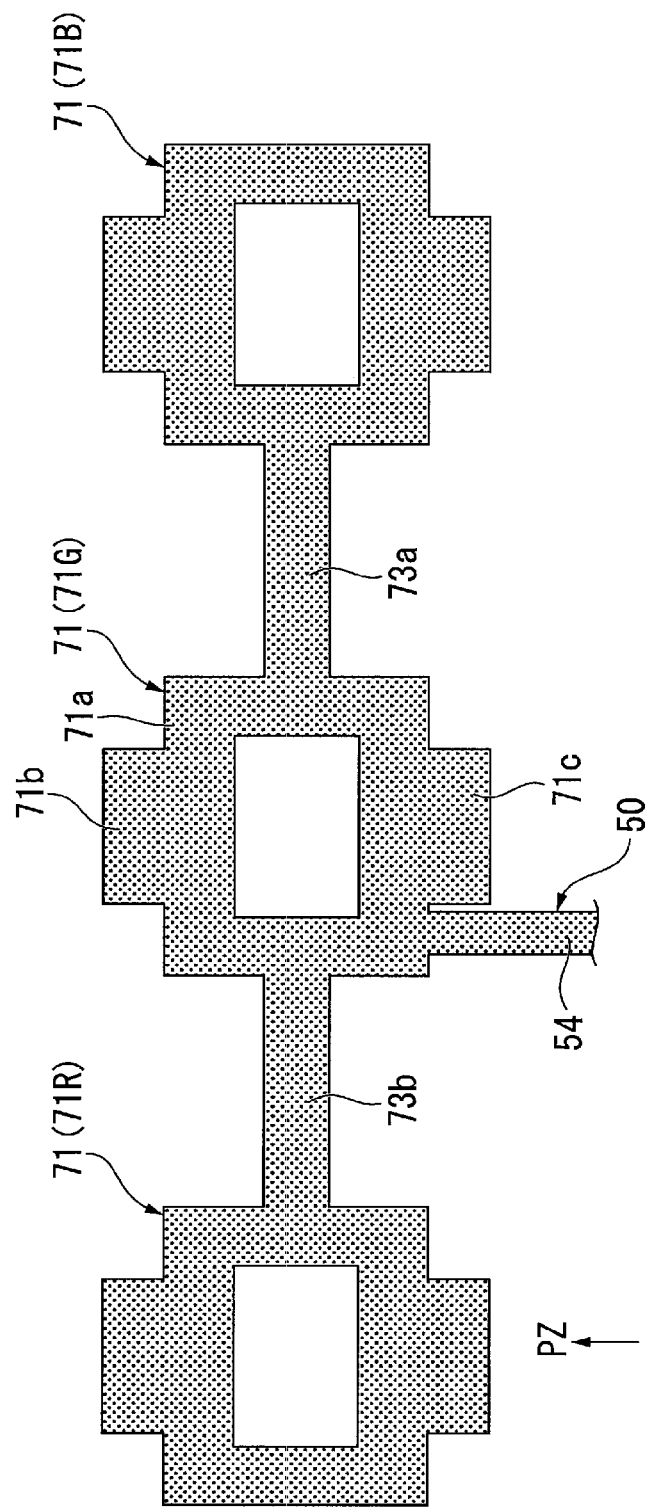
FIG. 9 shows refrigerant holders in the first embodiment.

FIG. 9 shows the refrigerant holder 71. The refrigerant holder 71 includes a main body section 71a, which has a rectangular-frame-like shape, and insertion sections 71b and 71c, which are provided at opposite ends of the main body section 71a that are the opposite ends in the upward/downward direction PZ, as shown in FIG. 9. The main body section 71a covers part of a surface of the holding frame 80 that is the surface facing the side toward which light is incident on the light modulator 4GP (−PX side), as shown in FIG. 8. An inner edge portion of the main body section 71a covers an outer edge portion of the light modulator 4GP. The insertion section 71b is bent and inserted into the insertion groove 82a of the holding frame 80. The insertion section 71c is bent and inserted into the insertion groove 82b of the holding frame 80.

The fixing member 72 is a member that fixes the refrigerant holder 71. The fixing member 72 is a plate-shaped member as shown in FIGS. 6 and 8. The fixing member 72 is made, for example, of a metal. The fixing member 72 includes a frame section 72a, which has a rectangular-frame-like shape, attachment sections 72b, and insertion sections 72c. The frame section 72a covers an outer edge portion of the refrigerant holder 71, as shown in FIGS. 7 and 8. The holding frame 80, the refrigerant holder 71, and the frame section 72a are layered on each other in the direction in which light passes through the light modulator unit 4G (optical axis direction PX). In the following description, the direction in which the holding frame 80, the refrigerant holder 71, and the frame section 72a are layered on each other is simply called a "layering direction." The fixing member 72 fixes the refrigerant holder 71 in such a way that the frame section 72a and the holding frame 80 sandwich the refrigerant holder 71 in the layering direction (optical axis direction PX).

The inner edge of the frame section 72a is so provided as to be shifted outward from the inner edge of the refrigerant holder 71. A portion of the refrigerant holder 71, that is, in the present embodiment, the portion inside the frame section 72a is exposed when viewed in the layering direction from the side facing the fixing member 72.

The attachment sections 72b are provided at four end portions of the frame section 72a, opposite end portions in the upward/downward direction PZ and opposite end portions in the width direction PY, as shown in FIGS. 6 and 8. The attachment sections 72b protrude from the frame section 72a toward the holding frame 80 (+PX side). The attachment sections 72b engage with protrusions provided on the side surface of the holding frame 80. The fixing member 72 is thus fixed to the holding frame 80.

The insertion sections 72c are provided at the opposite ends of the frame section 72a in the upward/downward direction PZ. The insertion sections 72c protrude from the frame section 72a toward the holding frame 80 (+PX side). The insertion sections 72c are inserted into the insertion grooves 82a and 82b of the holding frame 80. The insertion sections 72c press the insertion sections 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is connected to the refrigerant sender 50, as shown in FIG. 9. In more detail, the connector 54 of the refrigerant sender 50 is connected to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that no connector 54 is connected to the refrigerant holder 71B or the refrigerant holder 71R.

In the present embodiment, linkage sections 73a and 73b, which are each formed of a porous member, are provided and link the refrigerant holders 71, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage sections 73a and 73b.

The linkage section 73a links the refrigerant holder 71G attached to the light modulation unit 4G to the refrigerant holder 71B attached to the light modulation unit 4B. The refrigerant holder 71B is thus connected to the refrigerant sender 50 (connector 54) via the refrigerant holder 71G. The linkage section 73a is provided with a coating 74, which coats the linkage section 73a, as shown in FIG. 6. The coating 74 is, for example, a film made of a resin.

The linkage section 73b links the refrigerant holder 71 attached to the light modulation unit 4G to the refrigerant holder 71 attached to the light modulation unit 4R. The refrigerant holder 71R is thus connected to the refrigerant sender 50 (connector 54) via the refrigerant holder 71G. Although not shown, the linkage section 73b is similarly provided with a coating 74, as is the linkage section 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage section 73a and to the refrigerant holder 71R via the linkage section 73b. The refrigerant W generated by the refrigerant generator 20 is thus sent to the three light modulation units 4R, 4G, and 4B. The refrigerant W sent to and held in the refrigerant holders 71 then vaporizes to cool the light modulation units 4R, 4G, and 4B, which are each the cooling target.

According to the present embodiment, the cooler 10 is so configured that the refrigerant sender 50 can send the refrigerant W generated by the refrigerant generator 20 to the cooling target and vaporization of the refrigerant W, which is an endothermic reaction, can be used to draw heat from the cooling target to cool the cooling target. The cooling based on the vaporization of the refrigerant W can actively draw heat from the cooling target and therefore has excellent cooling performance as compared with air cooling and liquid cooling, in which the cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore does not cause an increase in noise. The projector 1 according to the present embodiment can therefore be configured to excel in cooling performance, have a compact size, and excel in quietness.

According to the present embodiment, in which the refrigerant generator 20 can generate the refrigerant W, a user's convenience can be improved because the user does not need to replenish the refrigerant W. Since the refrigerant generator 20 can generate a necessary amount of refrigerant W as necessary, the refrigerant W does not need to be stored, for example, in a storage tank, whereby the weight of the projector 1 can be reduced.

According to the present embodiment, the moisture absorbing/discharging member 40 can absorb water vapor contained in the air AR1 delivered from the first air blower 60, and the moisture absorbed by the moisture absorbing/discharging member 40 can be discharged in the form of water vapor into the air AR2 delivered by the second air blower 23. The heat exchanger 30 can then condense the moisture discharged in the form of water vapor into the air AR2 to generate the refrigerant W. Therefore, according to the present embodiment, the refrigerant W can be generated from the atmosphere in the projector 1.

According to the present embodiment, the moisture absorbing/discharging member 40 is fixed. Therefore, for example, no driver that rotates the moisture absorbing/discharging member 40 needs to be provided, whereby the electric power consumed by the refrigerant generator 20 can be reduced. Further, since the first air blower 60 delivers air outside the projector 1 to the moisture absorbing/discharging member 40, an intake fan of the projector 1 can be used as the first air blower 60. The refrigerant W can therefore be generated with no air blower separately provided. An increase in the number of parts of the projector 1 can therefore be avoided. Since an increase in the number of air blowers can be avoided, an increase in noise produced by the projector 1 can be avoided.

For example, in the refrigerant generator 20, when the humidity of the air AR2 delivered from the second air blower 23 to the heat exchanger 30 is relatively low, cooling the heat exchanger 30 is unlikely to allow generation of the refrigerant W in some cases. For example, in a case where air or any other substance outside the projector 1 mixes with the air AR2 delivered to the heat exchanger 30, the humidity of the air AR2 decreases in some cases.

In contrast, according to the present embodiment, the first layers 41, through which the air AR1 can flow in the first direction D1, and the second layers 42, through which the air AR2 can flow in the second direction D2, which intersects the first direction D1, are layered on each other to form the moisture absorbing/discharging member 40. The channel through which the air AR1 passing through the moisture absorbing/discharging member 40 in the first direction D1 flows and the channel through which the air AR2 passing through the moisture absorbing/discharging member 40 in the second direction D2 flows can therefore be separate from each other. The configuration described above can prevent the air outside the projector 1, such as the air AR1, from mixing with the air AR2, whereby a decrease in the humidity of the air AR2 can be avoided. Cooling the heat exchanger 30 therefore allows the refrigerant W to be preferably generated. Further, a situation in which foreign matter contained in the air outside the projector 1 mixes with the air AR2 can be avoided.

Specifically, in the present embodiment, the moisture absorbing channel 21b and the moisture discharging channel 25b are so disposed as to pass through the moisture absorbing/discharging member 40 that the interior of the moisture absorbing channel 21b and the interior of the moisture discharging channel 25b are isolated from each other. The opposite ends of the through holes 41a in the first direction D1 in the first layers 41 open in the moisture absorbing channel 21b, but the through holes 41a do not open in the moisture discharging channel 25b. The opposite ends of the through holes 42a in the second direction D2 in the second layers 42 open in the moisture discharging channel 25b, but the through holes 42a do not open in the moisture absorbing channel 21b.

Therefore, in the moisture absorbing channel 21b, the air AR1 flowing through the moisture absorbing channel 21b passes through the moisture absorbing/discharging member 40 in the first direction D1 via the through holes 41a in the first layers 41 but is not allowed to flow into the moisture discharging channel 25b through the moisture absorbing/discharging member 40. On the other hand, in the moisture discharging channel 25b, the air AR2 flowing through the moisture discharging channel 25b passes through the moisture absorbing/discharging member 40 in the second direction D2 via the through holes 42a in the second layers 42 but is not allowed to flow into the moisture absorbing channel 21b through the moisture absorbing/discharging member 40. Therefore, according to the present embodiment, the air AR1 and the air AR2 different from each other are allowed to pass through the moisture absorbing/discharging member 40 but are not allowed to mix with each other.

According to the present embodiment, the moisture absorbing/discharging member 40 is formed by alternately layering the plurality of first layers 41 and the plurality of second layers 42 on each other. The moisture absorbed by the first layers 41 when the air AR1 passes therethrough therefore readily moves into the second layers 42 adjacent to the first layers 41. The state in which the second layers 42 contain moisture is therefore readily achieved, and causing the air AR2 to pass through the second layers 42 readily causes the water vapor to be discharged into the air AR2. The air AR2 therefore preferably contains moisture, whereby the refrigerant W can be preferably generated.

According to the present embodiment, the heat exchanger 30 is cooled by the air AR1 having been exhausted from the first air blower 60 and having passed through the first layers 41 of the moisture absorbing/discharging member 40. No cooling section that cools the heat exchanger 30 therefore needs to be separately provided, whereby an increase in the number of parts of the projector 1 can be avoided. Further, an increase in noise produced by the projector 1 can be avoided unlike in a case where an air blower is separately provided as the cooling section that cools the heat exchanger 30.

According to the present embodiment, the first air blower 60 delivers the air AR1 to the light modulation units 4R, 4G, and 4B, which are each the cooling target. The refrigerant W sent by the air AR1 to the light modulation units 4R, 4G, and 4B therefore readily vaporizes, whereby the light modulation units 4R, 4G, and 4B can be further cooled. Further, since no air blower that cools the cooling target needs to be separately provided, an increase in the number of parts of the projector 1 can be avoided, and an increase in the noise can be avoided.

In the present embodiment, the first air blower 60, which is an intake fun that takes the outside air into the projector 1, is used to facilitate the vaporization of the refrigerant W delivered to the cooling target, as described above. Therefore, even when the power of the first air blower 60 is lowered, the same cooling performance provided in a case where no cooler 10 is provided can still be provided. The noise produced by the first air blower 60, which is an intake fan, can therefore be reduced by lowering the power of the first air blower 60, whereby the quietness of the projector 1 can be further improved.

According to the present embodiment, the heater 22 includes the heating main body 22a, which heats the air before passing through the moisture absorbing/discharging member 40, and the second air blower 23. The heater 22, in which the second air blower 23 delivers the air AR2 to the moisture absorbing/discharging member 40, can therefore heat the moisture absorbing/discharging member 40. The heater 22 can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the refrigerant generator 20 has the circulation path 27, through which the air AR2 exhausted from the second air blower 23 circulates. Configuring the circulation path 27 as a sealed path can therefore prevent the air outside the projector 1 from entering the circulation path 27, whereby the humidity of the air AR2 delivered to the heat exchanger 30 is readily maintained relatively high. Cooling the heat exchanger 30 therefore allows the refrigerant W to be preferably generated.

According to the present embodiment, the air AR1 and the air AR2 different from each other are allowed to pass through the moisture absorbing/discharging member 40 with the channels through which the air AR1 and the air AR2 different from each other flow separate from each other, as described above. Therefore, even in the configuration in which the circulation path 27 is sealed, the air AR1 from the first air blower 60 and the air AR2 from the second air blower 23 are allowed to pass through the moisture absorbing/discharging member 40. The humidity of the air AR2 can therefore be more preferably maintained by precisely sealing the circulation path 27. Cooling the heat exchanger 30 therefore allows the refrigerant W to be more preferably generated. The precise sealing of the circulation path 27 further prevents entry of foreign matter into the circulation path 27 in a more exact sense.

According to the present embodiment, the refrigerant sender 50 sends the refrigerant W based on capillarity. No pump or any other power source for sending the refrigerant W therefore needs to be separately provided. An increase in the number of parts of the projector 1 can therefore be avoided, whereby the size and weight of the projector 1 are readily reduced.

According to the present embodiment, the refrigerant sender 50 includes the connector 54, which is formed of a porous member and connects the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is connected to the connector 54. The second catcher 52 can therefore absorb the refrigerant W having accumulated in the second lid 33 and send the absorbed refrigerant W to the connector 54 based on capillarity. The generated refrigerant W is therefore readily delivered with no waste to the cooling target.

According to the present embodiment, the refrigerant sender 50 includes the catcher 51, which is provided in the first lid 32, and the third catchers 53, which connect the first catcher 51 to the second catcher 52. The first catcher 51 can therefore absorb the refrigerant W having accumulated in the first lid 32 and send the absorbed refrigerant W to the second catcher 52 via the third catchers 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target.

According to the present embodiment, the third catchers 53 pass through the pipes 31a. The third catchers 53 can therefore absorb the refrigerant W having accumulated in the pipe 31a and send the absorbed refrigerant W to the cooling target via the second catcher 52 and the connector 54. The generated refrigerant W is therefore readily delivered with no waste to the cooling target.

According to the present embodiment, the width of the connector 54 is greater, for example, than the width of the first catcher 51, the width of the second catcher 52, and the width of the third catchers 53. The width of the connector 54 is therefore readily increased to a relatively large value, whereby the amount of refrigerant W that can be sent by the connector 54 can be increased. The refrigerant sender 50 can therefore readily deliver the refrigerant W to the cooling target, whereby the cooling target is readily further cooled.

On the other hand, the width of the first catcher 51, the width of the second catcher 52, and the width of the third catchers 53 are each readily set at a relatively small value. The amount of refrigerant W held by each of the first catcher 51, the second catcher 52, and the third catchers 53 can therefore be reduced. The amount of refrigerant W held by the first catcher 51, the second catcher 52, and the third catchers 53 and hence left in the heat exchanger 30 can therefore be reduced, whereby the generated refrigerant W is readily delivered with no waste to the cooling target.

According to the present embodiment, the refrigerant holders 71, which hold the refrigerant W, are provided in the light modulation units 4R, 4G, and 4B, which are each the cooling target. The refrigerant holders 71 can therefore hold the refrigerant W sent to the light modulation units 4R, 4G, and 4B in the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holders 71 are attached to surfaces of the light modulation units 4R, 4G, and 4B, which are each the cooling target, and the refrigerant holders 71 are each formed of a porous member. At least part of each of the refrigerant holders 71 is exposed when viewed in the layering direction from the side facing the refrigerant holder 71. The refrigerant W therefore readily vaporizes via the exposed portion of each of the refrigerant holders 71, whereby the cooling performance of the cooler 10 can be further improved. Further, the refrigerant holders 71, which are each formed of a porous member, readily uniformly distribute the refrigerant W across the surfaces of the cooling target, which is provided with the refrigerant holders 71, based on capillarity, whereby the cooling target is readily further cooled.

For example, in a case where the refrigerant holders 71 are fixed to the holding frames 80 with an adhesive, the pores in the refrigerant holders 71, which are each formed of a porous member, are closed with the adhesive absorbed by the refrigerant holders 71 in some cases. The refrigerant holders 71 are therefore unlikely to absorb and hold the refrigerant W in some cases.

In contrast, according to the present embodiment, the fixing members 72 are so provided as to fix the refrigerant holders 71 in such a way that the fixing members 72 and the holding frames 80 sandwich the refrigerant holders 71. The refrigerant holders 71 can therefore be fixed to the holding frames 80 with no adhesive adhering to the refrigerant holders 71. The situation in which the refrigerant holders 71 are unlikely to hold the refrigerant W can therefore be avoided. Further, in the present embodiment, the fixing members 72 are made of a metal. The fixing members 72 therefore have relatively high heat conductivity and are hence likely to be cooled. The air AR1 from the first air blower 60 and the vaporization of the refrigerant W readily lower the temperature of the fixing members 72, whereby the cooling target, which is in contact with fixing members 72, is readily further cooled.

According to the present embodiment, the refrigerant holder 71 is provided on a surface of the holding frame 80 that is the surface facing the side toward which light is incident on the light modulator 4GP. The configuration described above can prevent the water vapor that is the vaporized refrigerant W discharged from the refrigerant holder 71 from affecting the light that exits out of the light modulator 4GP toward the light combining system 5 and can therefore prevent formation of noise in an image projected from the projector 1.

According to the present embodiment, the refrigerant holders 71 are provided in the plurality of light modulation units 4R, 4G, and 4B, and the linkage sections 73a and 73b are provided and link the plurality of refrigerant holders to each other. Connecting the refrigerant sender 50 to one of the refrigerant holders 71 therefore allows the refrigerant W to be sent to the other refrigerant holders 71. The routing of the refrigerant sender 50 in the projector 1 can therefore be simplified.

According to the present embodiment, the linkage sections 73a and 73b are provided with the coatings 74, which coat the linkage sections 73a and 73b. A situation in which the refrigerant W that moves along the linkage sections 73a and 73b vaporizes via the linkage sections 73a and 73b can therefore be avoided. Therefore, a situation in which the refrigerant W vaporizes without contributing to the cooling of the light modulation units 4R, 4G, and 4B, which are each the cooling target, can be avoided, whereby no waste of the generated refrigerant W occurs.

In the present embodiment, the connector 54 may also be coated, as are the linkage sections 73a and 73b. The configuration described above can prevent vaporization of the refrigerant W being sent to the cooling target. Therefore, the refrigerant W can be efficiently sent to the cooling target, and waste of the generated refrigerant W can further be suppressed. The circumference of each of the connector 54 and the linkage sections 73a and 73b may instead be covered, for example, with a tube. A coating treatment that suppresses vaporization may still instead be performed on the surface of each of the connector 54 and the linkage sections 73a and 73b.

In the present embodiment, the following configurations can also be employed. In the following description, configurations similar to those described above, for example, have the same reference characters as appropriate, and no description thereof will therefore be made in some cases.

Variation of First Embodiment

Figure 10:
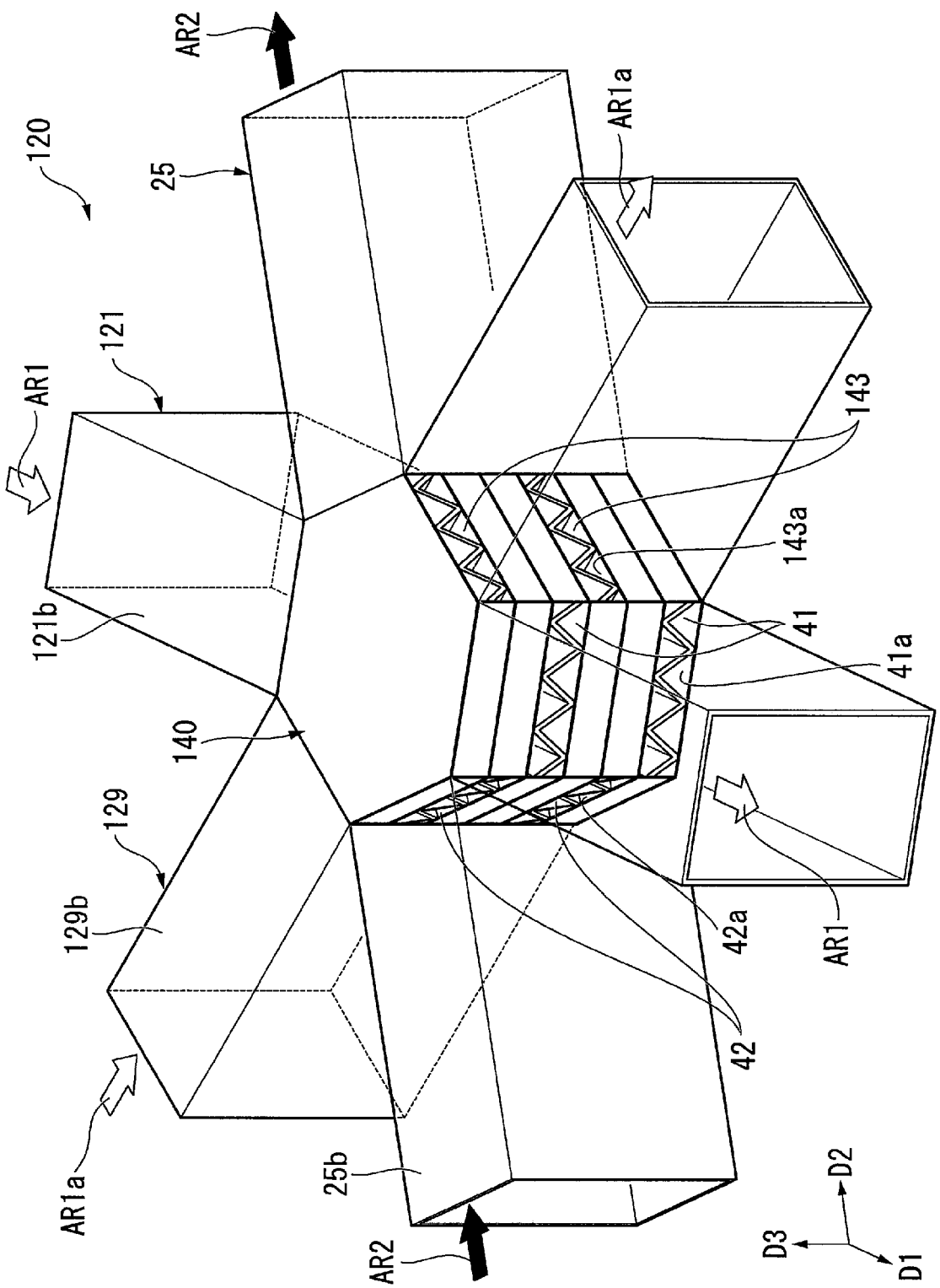
FIG. 10 is a perspective view showing part of a refrigerant generator according to Variation of the first embodiment.

FIG. 10 is a perspective view showing part of a refrigerant generator 120 according to the present variation. In the present variation, a moisture absorbing channel 121b of a moisture absorbing duct 121 has a rectangular cross-sectional shape perpendicular to the first direction D1, as shown in FIG. 10, unlike the moisture absorbing channel 21b shown in FIG. 4.

The refrigerant generator 120 according to the present variation further includes a second moisture absorbing duct 129. The second moisture absorbing duct 129 includes a second moisture absorbing channel 129b. The second moisture absorbing channel 129b extends in the direction that is perpendicular to the third direction D3 and intersect both the first direction D1 and the second direction D2. The second moisture absorbing channel 129b intersects the moisture absorbing channel 121b and the moisture discharging channel 25b at the portion where the moisture absorbing channel 121b and the moisture discharging channel 25b intersect each other. Air AR1a flows into the second moisture absorbing duct 129. The air AR1a is air sucked from the exterior of the projector by an air blower different from the first air blower 60.

A moisture absorbing/discharging member 140 is fixed in the portion where the moisture absorbing channel 121b, the moisture discharging channel 25b, and the second moisture absorbing channel 129b intersect one another. The moisture absorbing/discharging member 140 has, for example, an equilateral hexagonal columnar shape extending in the third direction D3. The moisture absorbing/discharging member 140 fills the portion where the channels described above intersect one another and isolates the interior of the moisture absorbing channel 121b, the interior of the moisture discharging channel 25b and the interior of the second moisture absorbing channel 129b from one another. The moisture absorbing/discharging member 140 is formed by layering the first layer 41, the second layer 42, and a third layer 143 on each other in the third direction D3. The first layer 141 is formed of a plurality of first layers 41, the second layer 42 is formed of a plurality of second layers 42, and the third layer 142 is formed of a plurality of third layers 143 (in FIG. 10, two first layers 41, two second layers 42, and two third layers 143 are provided). The first layers 41, the second layers 42, and the third layers 143 are alternately layered on each other in the presented order.

The third layers 143 each have an innumerable number of through holes 143a, which pass through the third layer 143 in the direction in which the second moisture absorbing channel 129b extends, and air can flow through the third layers 143 via the through holes 143a in the direction in which the second moisture absorbing channel 129b extends. The opposite ends of each of the through holes 143a in the direction in which the second moisture absorbing channel 129b extends in each of the third layers 143 open in the second moisture absorbing channel 129b. The third layers 143 absorb water vapor contained in the air AR1a when the air AR1a passes through the third layers 143 via the through holes 143a.

According to the present variation, the moisture absorbing/discharging member 140 includes the first layers 41 and the third layers 143 as layers that absorb moisture from air. The moisture absorbing/discharging member 140 can therefore absorb moisture from the air AR1 and the air AR1a. The moisture absorbing/discharging member 140 can thus readily absorb moisture, whereby the refrigerant W can be preferably generated.

In the above description, there are portions where the first layers 41 and the third layers 143, which are each a moisture absorbing layer, are adjacent to each other and layered on each other, but not necessarily. The order in which the three layers are layered on each other, the number of each of three layers, and other factors are not particularly specified. For example, any of the first layers 41 and the third layers 143, which are each a moisture absorbing layer, may alternately be layered on the second layers 42, which are each a moisture discharging layer. A plurality of the same layers may instead be successively layered on each other. Still instead, moisture discharging layers may be provided in addition to the second layers 42.

The directions in which air flows through the first layers 41 and the second layers 42 are perpendicular to each other, but not necessarily. The directions in which air flows through the first layers 41 and the second layers 42 are not limited to specific directions and may be any directions that intersect each other.

Second Embodiment

Figure 11:
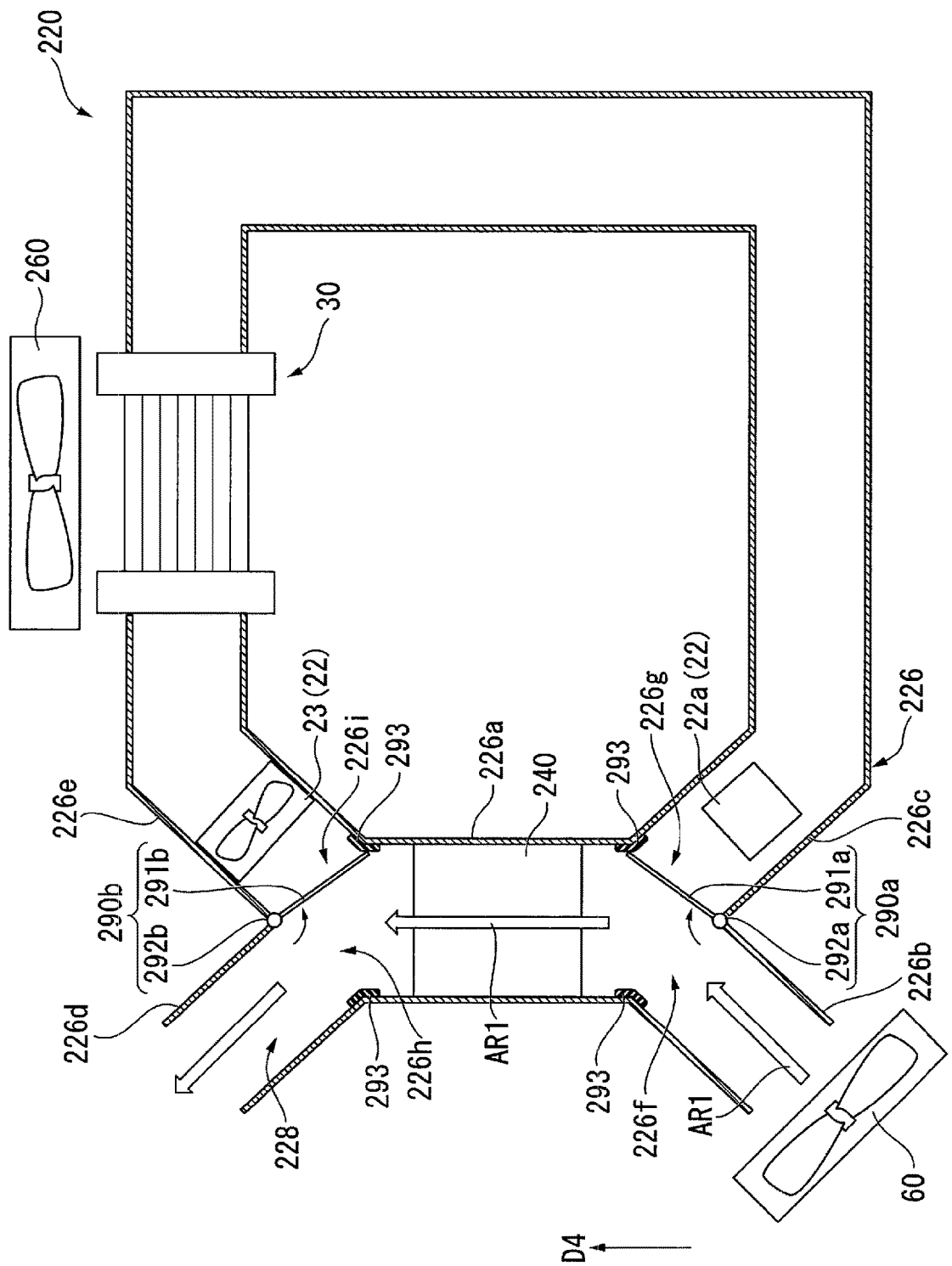
FIG. 11 is a schematic configuration diagram diagrammatically showing a refrigerant generator according to a second embodiment.
Figure 12:
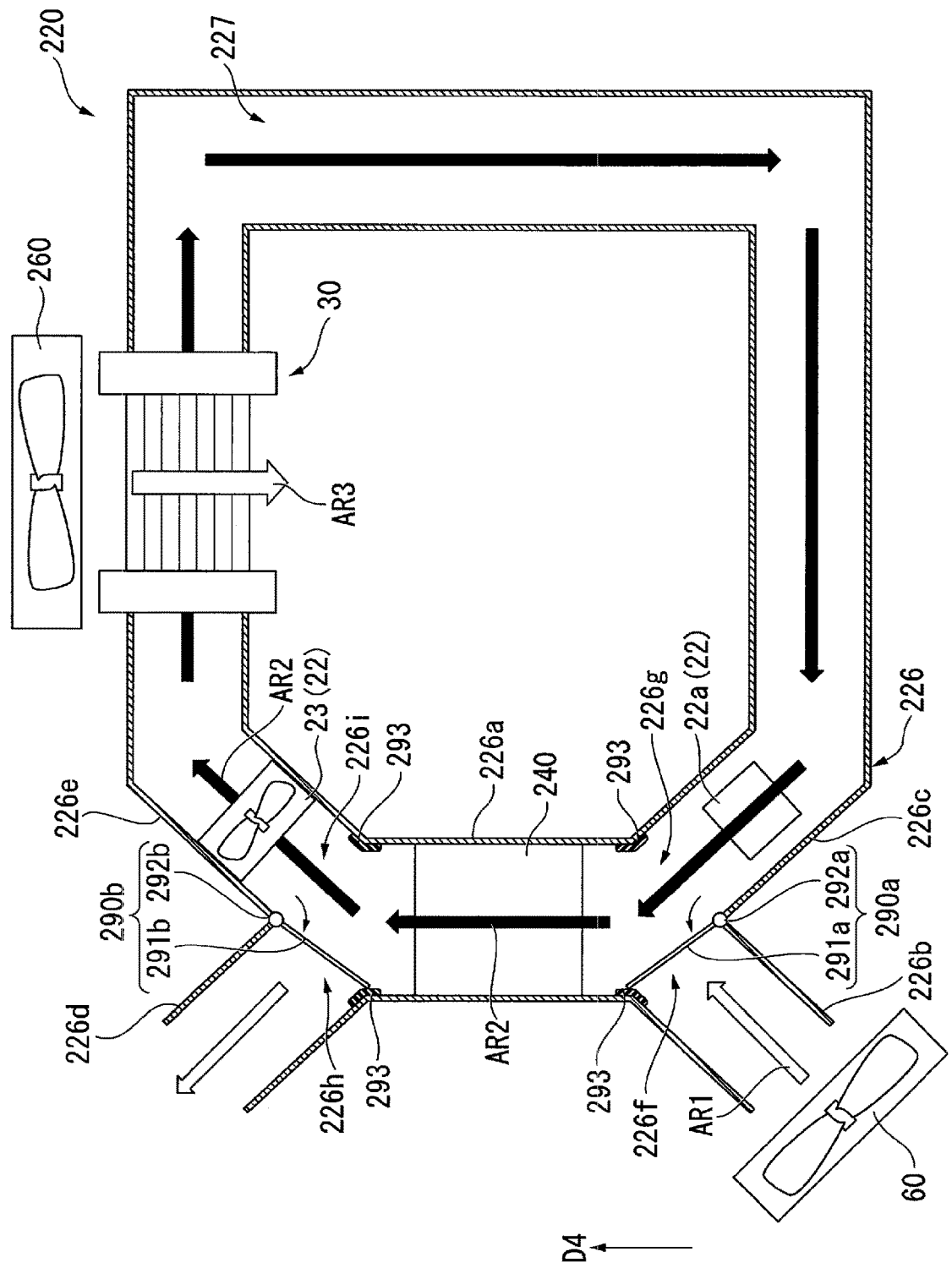
FIG. 12 is a schematic configuration diagram diagrammatically showing the refrigerant generator according to the second embodiment.

A second embodiment differs from the first embodiment in terms of the configuration of the refrigerant generator. It is noted that configurations similar to those described above, for example, have the same reference characters as appropriate, and that no description thereof will therefore be made in some cases. FIGS. 11 and 12 are schematic configuration diagrams diagrammatically showing a refrigerant generator 220 according to the present embodiment.

In the present embodiment, the refrigerant generator 220 includes a circulation duct 226, buffers 293, channel switchers 290a and 290b, and a third air blower 260, as shown in FIGS. 11 and 12. The circulation duct 226 includes a moisture absorbing/discharging channel 226a, a first channel 226b, a second channel 226c, a third channel 226d, and a fourth channel 226e. The moisture absorbing/discharging channel 226a extends in one direction. In the following description, the one direction in which the moisture absorbing/discharging channel 226a extends is called a "fourth direction D4" and drawn in the form of an axis D4 in FIGS. 11 and 12. In the moisture absorbing/discharging channel 226a, the negative side of the axis D4 (−D4 side) is called an "upstream side," and the positive side of the axis D4 (+D4 side) is called a "downstream side."

The opposite ends of the moisture absorbing/discharging channel 226a in the fourth direction D4 open. A moisture absorbing/discharging member 240 is fixed in the moisture absorbing/discharging channel 226a. In the present embodiment, the moisture absorbing/discharging member 240 is a porous member, which absorbs and discharges moisture and air can flow through the moisture absorbing/discharging member 240 in the fourth direction D4.

The first channel 226b is connected to an upstream-side end portion (−D4-side end portion) of the moisture absorbing/discharging channel 226a. The first channel 226b has a first opening 226f, which is continuous with the upstream-side end portion of the moisture absorbing/discharging channel 226a. The air AR1 from the first air blower 60 flows into the first channel 226b. The air AR1 having flowed into the first channel 226b flows toward the first opening 226f. That is, in the present embodiment, the first air blower 60 delivers the air AR1 toward the first opening 226f via the interior of the first channel 226b.

The second channel 226c is connected to the upstream-side end portion (−D4-side end portion) of the moisture absorbing/discharging channel 226a. The second channel 226c has a second opening 226g, which is continuous with the upstream-side end portion of the moisture absorbing/discharging channel 226a. An end portion of the second channel 226c that is the end portion opposite the end portion connected to the moisture absorbing/discharging channel 226a is connected to the heat exchanger 30. The heating main body 22a is disposed in the second channel 226c.

End portions of the first channel 226b and the second channel 226c that are the end portions connected to the moisture absorbing/discharging channel 226a are disposed side by side in the direction perpendicular to the fourth direction D4 (rightward/leftward direction in FIGS. 11 and 12) and separate from the moisture absorbing/discharging channel 226a in the form of a Y-letter shape toward the upstream side (−D4 side). The end portions of the first channel 226b and the second channel 226c that are the end portions connected to the moisture absorbing/discharging channel 226a are connected to each other.

The third channel 226d is connected to a downstream-side end portion (+D4-side end portion) of the moisture absorbing/discharging channel 226a. The third channel 226d has a third opening 226h, which is continuous with the downstream-side end portion of the moisture absorbing/discharging channel 226a. An end portion of the third channel 226d that is the end portion opposite the end portion connected to the moisture absorbing/discharging channel 226a extends, for example, to the light modulation units 4R, 4G, and 4B, which are each the cooling target.

The fourth channel 226e is connected to the downstream-side end portion (+D4-side end portion) of the moisture absorbing/discharging channel 226a. The fourth channel 226e has a fourth opening 226i, which is continuous with the downstream-side end portion of the moisture absorbing/discharging channel 226a. An end portion of the fourth channel 226e that is the end portion opposite the end portion connected to the moisture absorbing/discharging channel 226a is connected to the heat exchanger 30. The second channel 226c and the fourth channel 226e are thus connected to each other via the heat exchanger 30. The second air blower 23 is disposed in the fourth channel 226e.

The second air blower 23 causes the air AR2 to flow into the fourth channel 226e, as shown in FIG. 12. The air AR2 in the fourth channel 226e flows into the second channel 226c via the heat exchanger 30. The air AR2 having flowed into the second channel 226c flows toward the second opening 226g. That is, in the present embodiment, the second air blower 23 delivers the air AR2 toward the second opening 226g via the interior of the second channel 226c.

End portions of the third channel 226d and the fourth channel 226e that are the end portions connected to the moisture absorbing/discharging channel 226a are disposed side by side in the direction perpendicular to the fourth direction D4 (rightward/leftward direction in FIGS. 11 and 12) and separate from the moisture absorbing/discharging channel 226a in the form of a Y-letter shape toward the downstream side (+D4 side). The end portions of the third channel 226d and the fourth channel 226e that are the end portions connected to the moisture absorbing/discharging channel 226a are connected to each other. In the rightward/leftward direction in FIGS. 11 and 12, the side where the third channel 226d is disposed with respect to the fourth channel 226e (left in FIGS. 11 and 12) is the same as the side where the first channel 226b is disposed with respect to the second channel 226c.

The channel switcher 290a includes a hinge 292a, which is provided on the inner surface of the corner at the portion where the first channel 226b and the second channel 226c are connected to each other, and a closing lid 291a, which pivots around the hinge 292a in the circulation duct 226. The closing lid 291a, when it pivots, switches its state between a state in which the second opening 226g is closed, as shown in FIG. 11, and a state in which the first opening 226f is closed, as shown in FIG. 12. The channel switcher 290a thus closes one of the first opening 226f and the second opening 226g in a switchable manner.

The channel switcher 290b includes a hinge 292b, which is provided on the inner surface of the corner at the portion where the third channel 226d and the fourth channel 226e are connected to each other, and a closing lid 291b, which pivots around the hinge 292b in the circulation duct 226. The closing lid 291b, when it pivots, switches its state between a state in which the fourth opening 226i is closed, as shown in FIG. 11, and a state in which the third opening 226h is closed, as shown in FIG. 12. The channel switcher 290b thus closes one of the third opening 226h and the fourth opening 226i in a switchable manner.

FIG. 11 shows a case where the channel switcher 290a closes the second opening 226g and the channel switcher 290b closes the fourth opening 226i. In this case, the first opening 226f and the third opening 226h are opened, and the first channel 226b, the moisture absorbing/discharging channel 226a, and the third channel 226d are connected to each other to form a moisture absorbing path 228. The air AR1 exhausted from the first air blower 60 and flowing into the first channel 226b therefore flows into the moisture absorbing/discharging channel 226a via the first opening 226f, passes through the moisture absorbing/discharging member 240 in the fourth direction D4, and flows into the third channel 226d via the third opening 226h.

Since the third channel 226d extends to the light modulation units 4R, 4G, and 4B, which are each the cooling target, the air AR1 having flowed into the third channel 226d is delivered to the light modulation units 4R, 4G, and 4B, which are each the cooling target. That is, in the case where the channel switcher 290a closes the second opening 226g and opens the first opening 226f, the air AR1 delivered from the first air blower 60 flows into the moisture absorbing/discharging channel 226a via the first opening 226f, passes through the moisture absorbing/discharging member 240, and is delivered to the cooling target.

On the other hand, FIG. 12 shows a case where the channel switcher 290a closes the first opening 226f and the channel switcher 290b closes the third opening 226h. In this case, the second channel 226c, the moisture absorbing/discharging channel 226a, the fourth channel 226e, and the heat exchanger 30 are connected to each other to form a moisture absorbing path 227. As a result, the air AR2 delivered by the second air blower 23 flows from the fourth channel 226e into the second channel 226c via the heat exchanger 30 and flows into the moisture absorbing/discharging channel 226a via the second opening 226g. The air AR2 then passes through the moisture absorbing/discharging member 240 in the fourth direction D4, returns to the fourth channel 226e again via the fourth opening 226i, and is sucked by the second air blower 23.

In the case where the channel switcher 290a closes the first opening 226f and opens the second opening 226g, as described above, the air AR2 delivered from the second air blower 23 flows into the moisture absorbing/discharging channel 226a via the second opening 226g, passes through the moisture absorbing/discharging member 240, and flows into the heat exchanger 30. The circulation path 227 is sealed.

In the present embodiment, the channel switcher 290a closes the first opening 226f or the second opening 226g based on the flow rate of the air AR1 delivered from the first air blower 60 toward the first opening 226f and the flow rate of the air delivered from the second air blower 23 toward the second opening 226g.

When the flow rate of the air AR1 delivered from the first air blower 60 toward the first opening 226f is greater than the flow rate of the air AR2 delivered from the second air blower 23 toward the second opening 226g, the channel switcher 290a closes the second opening 226g. For example, when the flow rate of the air AR1 delivered toward the first opening 226f is increased from the state shown in FIG. 12, the force exerted by the air AR1 on the closing lid 291a increases. When the flow rate of the air AR1 becomes greater than the flow rate of the air AR2, the force exerted by the air AR1 on the closing lid 291a becomes greater than the force exerted by the air AR2 on the closing lid 291a. The closing lid 291a having closed the first opening 226f then pivots around the hinge 292a to close the second opening 226g, as shown in FIG. 11.

On the other hand, when the flow rate of the air AR2 delivered from the second air blower 23 toward the second opening 226g is greater than the flow rate of the air AR1 delivered from the first air blower 60 toward the first opening 226f, the channel switcher 290a closes the first opening 226f. For example, when the flow rate of the air AR2 delivered toward the second opening 226g is increased from the state shown in FIG. 11, the force exerted by the air AR2 on the closing lid 291a increases. When the flow rate of the air AR2 becomes greater than the flow rate of the air AR1, the force exerted by the air AR2 on the closing lid 291a becomes greater than the force exerted by the air AR1 on the closing lid 291a. The closing lid 291a having closed the second opening 226g then pivots around the hinge 292a to close the first opening 226f, as shown in FIG. 12.

As described above, in the present embodiment, adjusting the flow rate of the air AR1 from the first air blower 60 and the flow rate of the air AR2 from the second air blower 23 allows the opening to be closed by the channel switcher 290a to be switched between the first opening 226f and the second opening 226g.

In the present embodiment, the first air blower 60 and the second air blower 23 are so controlled that the sum of the flow rate of the air AR1 exhausted from the first air blower 60 and the flow rate of the air AR2 exhausted from the second air blower 23 is fixed. Therefore, for example, in the case where one of the flow rate of the air AR1 and AR2 is increased as described above, the other air flow rate decreases as the one air flow rate increases. In the present embodiment, for example, in the case where the second opening 226g and the fourth opening 226i are closed and the first opening 226f and the third opening 226h are opened, the air flow rates are so controlled that the flow rate of the air AR2 from the second air blower 23 is zero, that is, the second air blower 23 stops delivering air.

The channel switcher 290b operates in cooperation with the switching operation performed by the channel switcher 290a described above. Specifically, when the channel switcher 290a switches its state from the state in which the first opening 226f is closed to the state in which the second opening 226g is closed, the channel switcher 290b switches its state from the state in which the third opening 226h is closed to the state in which the fourth opening 226i is closed. On the other hand, when the channel switcher 290a switches its state from the state in which the second opening 226g is closed to the state in which the first opening 226f is closed, the channel switcher 290b switches its state from the state in which the fourth opening 226i is closed to the state in which the third opening 226h is closed.

The buffers 293 are provided on the inner surface of the corner where the moisture absorbing/discharging channel 226a is connected to the first channel 226b, the inner surface of the corner where the moisture absorbing/discharging channel 226a is connected to the second channel 226c, the inner surface of the corner where the moisture absorbing/discharging channel 226a is connected to the third channel 226d, and the inner surface of the corner where the moisture absorbing/discharging channel 226a is connected to the fourth channel 226e. The buffers 293 are each an elastic member. The buffers 293 are made, for example, of rubber. When any of the openings is closed, the front end of the corresponding one of the closing lids 291a and 291b comes into contact with one of the buffers 293.

The third air blower 260 cools the heat exchanger 30. The third air blower 260 is not limited to a specific device and may be any device capable of cooling the heat exchanger 30, for example, an axial fan and a centrifugal fan. In the present embodiment, the third air blower 260 is controlled based on the switching operation performed by the channel switcher 290a. Specifically, in the case where the channel switcher 290a closes the first opening 226f and opens the second opening 226g, the third air blower 260 delivers air AR3 to the heat exchanger 30 to cool the heat exchanger 30, as shown in FIG. 12. On the other hand, in the case where the channel switcher 290a closes the second opening 226g and opens the first opening 226f, the third air blower 260 stops delivering air to stop cooling the heat exchanger 30.

The air blowers described above are controlled by a controller that is not shown. The controller that is not shown may be a controller that controls portions that form the projector excluding the refrigerant generator or may be a controller separately provided to control the refrigerant generator 220.

The controller first increases the flow rate of the air AR1 flowing from the first air blower 60 into the first channel 226b to a value greater than the flow rate of the air AR2 flowing from the second air blower 23 into the second channel 226c to cause the channel switchers 290a and 290b to perform the switching operation to achieve the state in which the second opening 226g and the fourth opening 226i are closed and the first opening 226f and the third opening 226h are open, as shown in FIG. 11. The moisture absorbing path 228 is therefore formed, and the air AR1 from the first air blower 60 passes through the moisture absorbing/discharging member 240. Water vapor contained in the air AR1 is therefore absorbed by the moisture absorbing/discharging member 240.

The controller then increases the flow rate of the air AR2 flowing from the second air blower 23 into the second channel 226c to a value greater than the flow rate of the air AR1 flowing from the first air blower 60 into the first channel 226b to cause the channel switchers 290a and 290b to perform the switching operation to achieve the state in which the first opening 226f and the third opening 226h are closed and the second opening 226g and the fourth opening 226i are open, as shown in FIG. 12. The sealed circulation path 227 is thus formed, and the air AR2 heated by the heating main body 22a passes through the moisture absorbing/discharging member 240. Moisture absorbed by the moisture absorbing/discharging member 240 is therefore discharged into the air AR2. The air AR2 to which the moisture has been discharged from the moisture absorbing/discharging member 240 flows into the heat exchanger 30.

The controller causes the channel switchers 290a and 290b to perform the switching operation to achieve the state shown in FIG. 12 and controls the third air blower 260 to deliver the air AR3 to the heat exchanger 30. The air AR2 is therefore cooled in the heat exchanger 30 to generate the refrigerant W.

The controller then increases the flow rate of the air AR1 flowing from the first air blower 60 into the first channel 226b to a value greater than the flow rate of the air AR2 flowing from the second air blower 23 into the second channel 226c to cause the channel switchers 290a and 290b to perform the switching operation to achieve the state shown in FIG. 11 again. The moisture absorbing/discharging member 240 therefore absorbs water vapor contained in the air AR1 again. In this process, the controller stops the third air blower 260.

As described above, the controller controls the first air blower 60 and the second air blower 23 to cause the channel switchers 290a and 290b to alternately switch the state shown in FIG. 11 to the state shown in FIG. 12 and vice versa whenever a predetermined period elapses. The air passing through the moisture absorbing/discharging member 240 is therefore switched from the air AR1 to the air AR2 and vice versa, and the repeated moisture absorption and discharge generates the refrigerant W.

According to the present embodiment, the channel switcher 290a, which closes one of the first opening 226f and the second opening 226g, which are continuous with the moisture absorbing/discharging channel 226a, is provided. The channel switcher 290a can therefore switch the state in which the first opening 226f is closed and the second opening 226g is open to the state in which the first opening 226f is open and the second opening 226g is closed and vice versa and can therefore switch the air flowing into the moisture absorbing/discharging channel 226a between the air AR1 which is exhausted from the first air blower 60 and from which the moisture absorbing/discharging member 240 absorbs moisture and the air AR2 which is exhausted from the second air blower 23 and into which the moisture absorbing/discharging member 240 discharges moisture. Therefore, causing the moisture absorbing/discharging member 240 fixed in the moisture absorbing/discharging channel 226a to alternately and repeatedly absorb and discharge moisture allows generation of the refrigerant W.

Further, since the channel to be continuous with the moisture absorbing/discharging channel 226a can be switched to the first channel 226b or the second channel 226c, the first channel 226b, through which the air AR1 from the first air blower 60 flows, does not need to be continuous with the moisture absorbing/discharging channel 226a when the second channel 226c, through which the air AR2 from the second air blower 23 flows, is continuous with the moisture absorbing/discharging channel 226a. Therefore, in the case where the second channel 226c, through which the air AR2 from the second air blower 23 flows, is caused to continuous with the moisture absorbing/discharging channel 226a to form the circulation path 227, the circulation path 227 is readily sealed. A decrease in the humidity of the air AR2 delivered from the second air blower 23 can therefore avoided, whereby the refrigerant W can be preferably generated. Further, entry of foreign matter into the circulation path 227 can also be avoided.

According to the present embodiment, the channel switcher 290a switches the state in which the first opening 226f is closed to the state in which the second opening 226g is closed and vice versa based on the flow rate of the air AR1 delivered from the first air blower 60 toward the first opening 226f and the flow rate of the air AR2 delivered from the second air blower 23 toward the second opening 226g. The air flowing into the moisture absorbing/discharging channel 226a can therefore be appropriately selected in accordance with the flow rate of the air exhausted from each of the air blowers.

Further, according to the present embodiment, when the flow rate of the air AR1 delivered from the first air blower 60 toward the first opening 226f is greater than the flow rate of the air AR2 delivered from the second air blower 23 toward the second opening 226g, the channel switcher 290a closes the second opening 226g. On the other hand, when the flow rate of the air AR2 delivered from the second air blower 23 toward the second opening 226g is greater than the flow rate of the air AR1 delivered from the first air blower 60 toward the first opening 226f, the channel switcher 290a closes the first opening 226f. The difference in the flow rate between the air AR1 and the air AR2 can therefore be used to apply force to the channel switcher 290a to readily cause the state of the channel switcher 290a to switch from one to the other. No driver or any other component for causing the state of the channel switcher 290a to switch from one to the other therefore needs to be provided, whereby the electric power consumed by the refrigerant generator 220 can be reduced.

According to the present embodiment, in the case where the channel switcher 290a closes the second opening 226g and opens the first opening 226f, the air AR1 delivered from the first air blower 60 passes through the moisture absorbing/discharging member 240 and is delivered to the cooling target. The cooling target is therefore readily further cooled.

According to the present embodiment, the first air blower 60 and the second air blower 23 are so controlled that the sum of the flow rate of the air AR1 exhausted from the first air blower 60 and the flow rate of the air AR2 exhausted from the second air blower 23 is fixed. The magnitude of noise produced by the first air blower 60 and the second air blower 23 is therefore readily fixed. Therefore, controlling the first air blower 60 and the second air blower 23 to cause the channel switcher 290a to perform the switching operation described above causes no variation in the magnitude of the noise.

According to the present embodiment, the third air blower 260, which cools the heat exchanger 30, is provided. The heat exchanger 30 can therefore be readily cooled without routing the air AR1 exhausted from the first air blower 60.

According to the present embodiment, the third air blower 260 is controlled based on the switching operation performed by the channel switcher 290a. Therefore, for example, in the case where the channel switcher 290a closes the first opening 226f and opens the second opening 226g, the third air blower 260 exhausts the air AR3 to cool the heat exchanger 30, whereas in the case where the channel switcher 290a closes the second opening 226g and opens the first opening 226f, the third air blower 260 can be stopped. Therefore, in the case where the air AR2 from the second air blower 23 flows into the heat exchanger 30, the third air blower 260 can be selectively driven. The electric power consumed by the third air blower 260 can therefore be reduced. Further, since the third air blower 260 is stopped in the case where the moisture absorbing/discharging member 240 absorbs moisture from the air AR1 from the first air blower 60, no noise is produced by the third air blower 260, whereby noise produced by the projector can be reduced.

According to the present embodiment, the buffers 293 are so provided that when the closing lids 291a and 291b each close one of the openings, the front ends of the closing lids 291a and 291b come into contact with corresponding ones of the buffers 293. Therefore, even when the closing lids 291a and 291b each pivot at a relatively high speed, the buffers 293 can absorb impact produced when the closing lids 291a and 291b collide with the inner surface of the circulation duct 226. Therefore, when the channel switchers 290a and 290b perform the switching operation, no noise is produced when the closing lids 291a and 291b collide with the inner surface of the circulation duct 226. Further, since the buffers 293 are each an elastic member, the gaps between the closing lids 291a and 291b and the inner surface of the circulation duct 226 can be precisely sealed. The circulation path 227 can therefore be precisely sealed.

In the present embodiment, part of the air AR1 exhausted from the first air blower 60 may be delivered to the heat exchanger 30 to cool the heat exchanger 30, as in the first embodiment. In this configuration, for example, part of the air AR1 exhausted from the first air blower 60 passes through a channel different from the first opening 226b and is splayed to the heat exchanger 30. In this configuration, no third air blower 260 may be provided.

The first air blower 60, the second air blower 23, and the third air blower 260 may instead be so controlled that the sum of the flow rate of the air AR1 from the first air blower 60, the flow rate of the air AR2 from the second air blower 23, and the flow rate of the air AR3 from the second air blower 260 is fixed. The configuration described above readily allows the noise produced by the projector to be further fixed. Further, the third air blower 260 may not stop operating during the period for which the air AR1 from the first air blower 60 passes through the moisture absorbing/discharging member 240. In this case, for example, the flow rate of the air AR3 exhausted from the third air blower 260 may be reduced to a value smaller than the flow rate thereof during the period for which the air AR2 from the second air blower 23 passes through the moisture absorbing/discharging member 240.

The channel switcher 290b may also be configured to perform the switching operation by using the difference in air flow rate, as is the channel switcher 290a described above. The channel switchers 290a and 290b may include drivers that cause the closing lids 291a and 291b to pivot. In this case, the controller that is not shown controls the drivers to cause the channel switchers 290a and 290b to perform the switching operation.

In the rightward/leftward direction in the drawings, the side where the third channel 226d is disposed with respect to the fourth channel 226e may instead be the side opposite the side where the first channel 226b is disposed with respect to the second channel 226c.

In each of the embodiments described above, the moisture absorbing/discharging member does not necessarily have a specific shape. The shape of the moisture absorbing/discharging member can be determined as appropriate in accordance with the cross-sectional shape of the channel in which the moisture absorbing/discharging member is disposed.

The refrigerant generated by the refrigerant generator is not limited to a specific medium and may be any non-water medium capable of cooling the cooling target. The configuration of the refrigerant sender is not limited to the configuration in the embodiments described above. The refrigerant sender does not necessarily have a specific configuration and may have any configuration that can send the refrigerant to the cooling target. The refrigerant sender may include a pump that sends the refrigerant and a pipe through which the refrigerant sent by the pump passes. The refrigerant sender may still instead send the refrigerant to the cooling target, for example, by using gravity.

The configuration of the cooling facilitators is not limited to the configuration in the embodiments described above. The cooling facilitators do not necessarily have a specific configuration and may have any configuration that can facilitate the cooling of the cooling target performed by the refrigerant sent to the cooling target. For example, the refrigerant holder of each of the cooling facilitators may be minute protruding portions and recessed portions formed in the surface of the cooling target, for example, by processing the surface. In this case, the protruding portions and the recessed portions hold the refrigerant. Still instead, the refrigerant holders may, for example, each be a hydrophilic coating provided on the surface of the cooling target.

The heater in the embodiments described above does not necessarily have the configuration described above. The heater may have a configuration in which the heater comes into contact with the moisture absorbing/discharging member to heat the moisture absorbing/discharging member. In this case, the heater may not heat the air before passing through the moisture absorbing/discharging member.

The cooling target in the embodiments described above is the light modulation units, but not necessarily. The cooling target may include at least one of the light modulators, the light modulation units, the light source device, a wavelength conversion element that converts the wavelength of the light outputted from the light source device, a diffuser element that diffuses the light outputted from the light source device, and a polarization conversion element that converts the polarization direction of the light outputted from the light source device. According to the configuration described above, the portions of the projector can be cooled in the same manner described above.

In the embodiments described above, the description has been made with reference to the case where the invention is applied to a transmission-type projector, and the invention is also applicable to a reflection-type projector. The term "transmission-type" means that the light modulators each including a liquid crystal panel or any other component are of light transmissive type. The term "reflection-type" means that the light modulators are of light reflective type. The light modulators are each not limited, for example, to a liquid crystal panel and may, for example, be a light modulator using a micromirror.

In the embodiments described above, the projector using the three light modulators has been presented by way of example. The invention is also applicable to a projector using only one light modulator and a projector using four or more light modulators.

The configurations described above can be combined with one another to the extent that the combination causes no contradiction.

The entire disclosure of Japanese Patent Application No. 2017-250700, filed Dec. 27, 2017 is expressly incorporated by reference herein.

What is claimed is:

1. A projector comprising:
    a light source device configured to emit light;
    a light modulator configured to modulate the light emitted from the light source device in accordance with an image signal;
    a projection optical device configured to project the light modulated by the light modulator; and
    a cooler configured to cool a cooling target based on transformation of a refrigerant into a gas,
    wherein the cooler includes
        a refrigerant generator configured to generate the refrigerant, and
        a refrigerant sender configured to send the generated refrigerant toward the cooling target,
    the refrigerant generator includes
        a moisture absorbing/discharging member,
        a first air blower configured to deliver air outside the projector to the moisture absorbing/discharging member,
        a heat exchanger connected to the refrigerant sender,
        a heater configured to heat the moisture absorbing/discharging member, and
        a second air blower configured to deliver, to the heat exchanger, air around a portion of the moisture absorbing/discharging member that is a portion heated by the heater,
    the heat exchanger, by cooling the air having flowed into the heat exchanger, generates the refrigerant from the air having flowed into the heat exchanger,
    the moisture absorbing/discharging member is fixed,
    the second air blower is configured to cause air to pass through the moisture absorbing/discharging member to deliver the air to the heat exchanger, and
    the heater includes
        a heating main body configured to heat the air before passing through the moisture absorbing/discharging member, and
        the second air blower.

2. The projector according to claim 1,
    wherein the moisture absorbing/discharging member is formed by layering a first layer through which air passes through in a first direction and a second layer through which air passes through in a second direction that intersects the first direction,
    wherein the first air blower is configured to cause air to pass through the first layer in the first direction, and
    wherein the second air blower is configured to cause air to pass through the second layer in the second direction to deliver the air to the heat exchanger.

3. The projector according to claim 2,
    wherein the first layer is formed of a plurality of first layers, and the second layer is formed of a plurality of second layers, and
    wherein the moisture absorbing/discharging member is formed by alternately layering the first layers and the second layers on each other.

4. The projector according to claim 2,
    wherein the heat exchanger is cooled by air having been exhausted from the first air blower and having passed through the first layer.

5. The projector according to claim 1,
    wherein the refrigerant generator includes
        a moisture absorbing/discharging channel in which the moisture absorbing/discharging member is fixed,
        a first channel having a first opening continuous with the moisture absorbing/discharging channel,
        a second channel having a second opening continuous with the moisture absorbing/discharging channel, and
        a channel switcher configured to close one of the first opening and the second opening in a switchable manner,
    wherein the first air blower delivers air toward the first opening through the first channel,
    wherein the second air blower delivers air toward the second opening through the second channel,
    wherein in a case where the channel switcher closes the second opening and the first opening is opened, the air delivered from the first air blower flows into the moisture absorbing/discharging channel via the first opening and passes through the moisture absorbing/discharging member, and
    wherein in a case where the channel switcher closes the first opening and the second opening is opened, the air delivered from the second air blower flows into the moisture absorbing/discharging channel via the second opening, passes through the moisture absorbing/discharging member, and flows into the heat exchanger.

6. The projector according to claim 5,
    wherein the channel switcher closes the first opening or the second opening based on both a flow rate of the air delivered from the first air blower toward the first opening and a flow rate of the air delivered from the second air blower toward the second opening.

7. The projector according to claim 6,
    wherein the channel switcher closes the second opening when the flow rate of the air delivered from the first air blower toward the first opening is greater than the flow rate of the air delivered from the second air blower toward the second opening, and
    wherein the channel switcher closes the first opening when the flow rate of the air delivered from the second air blower toward the second opening is greater than the flow rate of the air delivered from the first air blower toward the first opening.

8. The projector according to claim 5,
    wherein in a case where the channel switcher closes the second opening and the first opening is opened, the air delivered from the first air blower passes through the moisture absorbing/discharging member and is delivered to the cooling target.

9. The projector according to claim 5,
    wherein the first air blower and the second air blower are so controlled that a sum of a flow rate of the air exhausted from the first air blower and a flow rate of the air exhausted from the second air blower is fixed.

10. The projector according to claim 5,
    wherein the refrigerant generator further includes a third air blower configured to cool the heat exchanger.

11. The projector according to claim 10,
wherein the third air blower is controlled based on the switching operation performed by the channel switcher.

12. The projector according to claim 1,
wherein the refrigerant generator has a circulation path through which the air exhausted from the second air blower circulates, and
wherein the circulation path passes through the moisture absorbing/discharging member and the heat exchanger.

13. A projector comprising:

a light source device configured to emit light;

a light modulator configured to modulate the light emitted from the light source device in accordance with an image signal;

a projection optical device configured to project the light modulated by the light modulator; and a cooler configured to cool a cooling target based on transformation of a refrigerant into a gas, wherein the cooler includes
  a refrigerant generator configured to generate the refrigerant, and
  a refrigerant sender configured to send the generated refrigerant toward the cooling target, the refrigerant generator includes
  a moisture absorbing/discharging member,
  a first air blower configured to deliver air outside the projector to the moisture absorbing/discharging member,
  a heat exchanger connected to the refrigerant sender,
  a heater configured to heat the moisture absorbing/discharging member, and
  a second air blower configured to deliver, to the heat exchanger, air around a portion of the moisture absorbing/discharging member that is a portion heated by the heater, the heat exchanger, by cooling the air having flowed into the heat exchanger, generates the refrigerant from the air having flowed into the heat exchanger, the moisture absorbing/discharging member is fixed, the moisture absorbing/discharging member is formed by layering a first layer through which air passes through in a first direction and a second layer through which air passes through in a second direction that intersects the first direction, the first air blower is configured to cause air to pass through the first layer in the first direction, and the second air blower is configured to cause air to pass through the second layer in the second direction to deliver the air to the heat exchanger.

* * * * *